(12) United States Patent
Ke

(10) Patent No.: US 12,177,724 B2
(45) Date of Patent: Dec. 24, 2024

(54) METHOD FOR GUARANTEEING DATA TRANSMISSION AND COMMUNICATIONS DEVICE

(71) Applicant: VIVO MOBILE COMMUNICATION CO., LTD., Guangdong (CN)

(72) Inventor: Xiaowan Ke, Guangdong (CN)

(73) Assignee: VIVO MOBILE COMMUNICATION CO.,LTD., Guangdong (CN)

( * ) Notice: Subject to any disclaimer, the term of this patent is extended or adjusted under 35 U.S.C. 154(b) by 216 days.

(21) Appl. No.: 17/465,923

(22) Filed: Sep. 3, 2021

(65) Prior Publication Data

US 2021/0400538 A1    Dec. 23, 2021

Related U.S. Application Data

(63) Continuation of application No. PCT/CN2020/078199, filed on Mar. 6, 2020.

(30) Foreign Application Priority Data

Mar. 6, 2019   (CN) .......................... 201910169592.2

(51) Int. Cl.
*H04W 28/24*  (2009.01)
*H04L 45/30*  (2022.01)
(Continued)

(52) U.S. Cl.
CPC ............. *H04W 28/24* (2013.01); *H04L 45/30* (2013.01); *H04L 45/302* (2013.01);
(Continued)

(58) Field of Classification Search
CPC ................. H04W 28/24; H04W 40/02; H04W 28/0252; H04W 28/0257; H04W 28/0263;
(Continued)

(56) References Cited

U.S. PATENT DOCUMENTS 10,750,362 B2 *  8/2020  Yang ..................... H04L 63/107
2012/0263041 A1  10/2012  Giaretta et al.
2015/0312157 A1  10/2015  Liu
(Continued)

FOREIGN PATENT DOCUMENTS

CN     102469087 A   5/2012
CN     103906146 A   7/2014
(Continued)

OTHER PUBLICATIONS

Motorola Mobility et al, "PDU Session establishment for Trusted Non-3GPP Access", SA WG2 Meeting #131, S2-1901530, Feb. 25-Mar. 1, 2019, Santa Cruz, Tenerife, Spain.

*Primary Examiner* — Omer S Mian
(74) *Attorney, Agent, or Firm* — Price Heneveld LLP

(57) ABSTRACT

A method for guaranteeing data transmission and a communications device are provided. A method for guaranteeing data transmission applied to a first communications device includes: obtaining first information; and determining, based on the first information, a differentiated services code point DSCP corresponding to an Internet protocol security tunnel IPsec tunnel; where the first information includes at least one of the following: quality of service QoS information of a second network tunnel, data type information, a mapping relationship between differentiated service code points DSCPs and QoS information, a first QoS information requirement, and a first DSCP.

17 Claims, 10 Drawing Sheets

(51) Int. Cl.
*H04L 45/302* (2022.01)
*H04W 28/02* (2009.01)
*H04W 40/02* (2009.01)

(52) U.S. Cl.
CPC ....... *H04L 45/304* (2013.01); *H04W 28/0252* (2013.01); *H04W 28/0268* (2013.01); *H04W 40/02* (2013.01)

(58) Field of Classification Search
CPC .............. H04W 28/0268; H04W 28/16; H04L 45/30; H04L 45/302; H04L 45/304; H04L 45/64
See application file for complete search history.

(56) References Cited

U.S. PATENT DOCUMENTS

| | | | | |
|---|---|---|---|---|
| 2018/0376445 | A1* | 12/2018 | Yoon | H04W 60/06 |
| 2019/0059067 | A1* | 2/2019 | Lee | H04W 28/10 |
| 2019/0373511 | A1* | 12/2019 | Oyman | H04W 76/27 |
| 2020/0084744 | A1* | 3/2020 | Youn | H04W 76/30 |
| 2020/0329450 | A1* | 10/2020 | Youn | H04W 68/005 |
| 2021/0184965 | A1 | 6/2021 | Wang | |
| 2021/0345161 | A1* | 11/2021 | Zhu | H04W 28/12 |
| 2021/0377783 | A1* | 12/2021 | Yu | H04M 15/8228 |
| 2021/0410001 | A1* | 12/2021 | Shi | H04W 28/0268 |

FOREIGN PATENT DOCUMENTS

| | | | | |
|---|---|---|---|---|
| CN | 109286567 A | 1/2019 | | |
| WO | 2018208371 A1 | 11/2018 | | |
| WO | WO-2019062496 A1 * | 4/2019 | ............. | H04L 29/08 |

* cited by examiner

METHOD FOR GUARANTEEING DATA TRANSMISSION AND COMMUNICATIONS DEVICE

CROSS-REFERENCE TO RELATED APPLICATIONS

This application is a continuation of PCT Application No. PCT/CN2020/078199 filed on Mar. 6, 2020, which claims priority to Chinese Patent Application No. 201910169592.2, filed in China on Mar. 6, 2019, which is incorporated herein by reference in its entirety.

TECHNICAL FIELD

Embodiments of this disclosure relate to the field of wireless communications technologies, and in particular, to a method for guaranteeing data transmission and a communications device.

BACKGROUND

Many vertical industries, such as railway dispatching and automation control, impose communication requirements. At present, non-public networks(NPN) may be provided for vertical industries by using the fifth generation (5G) communications technology to meet the communication needs of the vertical industries. A non-public network usually provides services only in one area instead of full coverage.

Non-public networks may be deployed in a plurality of manners, for example, (1) standalone network, and (2) non-standalone network. A non-standalone network is for example, (a) a part of a communications network of the operator, or (b) a slice of a communications network of the operator.

A terminal subscribing to a non-public network may have also subscribed to a public network. A terminal subscribing to a public network terminal may have also subscribed to a non-public network. The terminal may have access to public network services (for example, public land mobile network (PLMN) services) via a non-public network. The terminal may also have access to a non-public network service via a public network (for example, access to non-public network services via a PLMN (access to selected non-public network services via a PLMN)).

Deployment of a non-public network typically does not include certain complex network services; and non-public network users are still expected to access public network services in coverage of the non-public network. Conversely, public network users are still expected to access non-public network services in coverage of the public network. How to guarantee services of a non-public network in a public network when a terminal accesses a network service of the public network via the non-public network, or how to guarantee services of a public network in a non-public network when a terminal accesses a network service of the non-public network via the public network is a technical problem that needs to be resolved urgently.

SUMMARY

According to a first aspect, an embodiment of this disclosure provides a method for guaranteeing data transmission, applied to a first communications device and including:

obtaining first information; and determining, based on the first information, a differentiated services code point DSCP corresponding to an Internet protocol security tunnel IPsec tunnel; where the first information includes at least one of the following: quality of service QoS information of a second network tunnel, data type information, a mapping relationship between differentiated service code points DSCPs and QoS information, a first QoS information requirement, and a first DSCP;

the first QoS information requirement is a QoS information requirement for control signaling or signaling IPsec tunnel data;

the data type information includes at least one of the following: control signaling of a second network, user-plane data of the second network, signaling IPsec tunnel data, and data IPsec tunnel data; and the first DSCP is a DSCP associated with control signaling or a signaling IPsec tunnel.

According to a second aspect, an embodiment of this disclosure provides a method for guaranteeing data transmission, applied to a second communications device and including:

obtaining second information; where the second information includes at least one of the following: data packet related information of first data, a first data network name DNN, guaranteed bit rate GBR-related quality of service QoS parameter information of a first network tunnel, a mapping policy of the first network tunnel, a mapping relationship between DSCPs and QoS information, and data monitoring information; and performing, based on the second information, a first operation related to the first network tunnel.

According to a third aspect, an embodiment of this disclosure provides a method for guaranteeing data transmission, applied to a third communications device and including:

transmitting first route selection information.

The first route selection information includes at least one of the following:

a first DNN and first traffic description information; where the first DNN is one of the following:

a DNN configured for accessing a second network or a proxy network element via a first network; and that used for a terminal to request a first tunnel with the first network, where the first tunnel is used for transmitting data between the terminal and the second network or data between the terminal and the proxy network element; and the first traffic description information is IP description information of the proxy network element.

According to a fourth aspect, an embodiment of this disclosure provides a method for guaranteeing data transmission, applied to a fourth communications device and including:

obtaining third information; and performing, based on the third information, a second operation related to a first network tunnel, where the third information includes at least one of the following: data packet related information of data in the first network tunnel, identification information of a second network tunnel associated with an IPsec tunnel, QoS information of the second network tunnel, and first route selection information.

The first route selection information includes at least one of the following:

a first DNN and first traffic description information; where the first DNN is one of the following:

a DNN configured for accessing a second network or a proxy network element via a first network;

that used for a terminal to request a first tunnel with the first network, where the first tunnel is used for transmitting data between the terminal and the second network or data between the terminal and the proxy network element; and the first traffic description information is IP description information of the proxy network element.

According to a fifth aspect, an embodiment of this disclosure provides a method for guaranteeing data transmission, applied to a fifth communications device and including:

determining a DSCP corresponding to an IPsec tunnel; where the determining a DSCP corresponding to an IPsec tunnel includes at least one of the following:

mapping a separate DSCP for each IPsec tunnel;

mapping a separate DSCP for each IPsec tunnel, where a second network tunnel associated with the IPsec tunnel is of a GBR type; and mapping a separate DSCP for each IPsec tunnel, where QoS information of the second network tunnel associated with the IPsec tunnel is at least one of the following: standardized QoS information, high-priority service QoS information, a QoS class indicator being 1, a QoS class indicator being 5, and a QoS class indicator being 69.

According to a sixth aspect, an embodiment of this disclosure provides a communications device, and the communications device is a first communications device, including:

a first obtaining module, configured to obtain first information; and a first determining module, configured to determine, based on the first information, a DSCP corresponding to an IPsec tunnel; where the first information includes at least one of the following:

quality of service QoS information of a second network tunnel, data type information, a mapping relationship between differentiated service code points DSCPs and QoS information, a first QoS information requirement, and a first DSCP;

the first QoS information requirement is a QoS information requirement for control signaling or signaling IPsec tunnel data;

the data type information includes at least one of the following: control signaling of a second network, user-plane data of the second network, signaling IPsec tunnel data, and data IPsec tunnel data; and the first DSCP is a DSCP associated with control signaling or a signaling IPsec tunnel.

According to a seventh aspect, an embodiment of this disclosure provides a communications device, and the communications device is a second communications device, including:

a second obtaining module, configured to obtain second information, where the second information includes at least one of the following: data packet related information of first data, a first DNN, GBR-related QoS parameter information of a first network tunnel, a mapping policy of the first network tunnel, a mapping relationship between DSCPs and QoS information, and data monitoring information; and a first execution module, configured to perform, based on the second information, a first operation related to the first network tunnel.

According to an eighth aspect, an embodiment of this disclosure provides a communications device, and the communications device is a third communications device, including:

a transmitting module, configured to transmit first route selection information; where The first route selection information includes at least one of the following:

a first DNN and first traffic description information; where the first DNN is one of the following:

a DNN configured for accessing a second network or a proxy network element via a first network;

that used for a terminal to request a first tunnel with the first network, where the first tunnel is used for transmitting data between the terminal and the second network or data between the terminal and the proxy network element; and the first traffic description information is IP description information of the proxy network element.

According to a ninth aspect, an embodiment of this disclosure provides a communications device, and the communications device is a fourth communications device, including:

a third obtaining module, configured to obtain third information; and a second execution module, configured to perform, based on the third information, a second operation related to a first network tunnel.

The third information includes at least one of the following: data packet related information of data in the first network tunnel, identification information of a second network tunnel associated with an IPsec tunnel, QoS information of the second network tunnel, and first route selection information.

The first route selection information includes at least one of the following:

a first DNN and first traffic description information; where the first DNN is one of the following:

a DNN configured for accessing a second network or a proxy network element via a first network;

that used for a terminal to request a first tunnel with the first network, where the first tunnel is used for transmitting data between the terminal and the second network or data between the terminal and the proxy network element; and the first traffic description information is IP description information of the proxy network element.

According to a tenth aspect, an embodiment of this disclosure provides a communications device, and the communications device is a fifth communications device, including:

a second determining module, configured to determine a DSCP corresponding to an IPsec tunnel; where the determining a DSCP corresponding to an IPsec tunnel includes at least one of the following:

mapping a separate DSCP for each IPsec tunnel;

mapping a separate DSCP for each IPsec tunnel, where a second network tunnel associated with the IPsec tunnel is of a GBR type; and mapping a separate DSCP for each IPsec tunnel, where QoS information of the second network tunnel associated with the IPsec tunnel is at least one of the following: standardized QoS information, high-priority service QoS information, a QoS class indicator being 1, a QoS class indicator being 5, and a QoS class indicator being 69.

According to an eleventh aspect, an embodiment of this disclosure provides a communications device, including a processor, a memory, and a program stored on the memory and capable of running on the processor. When the program is executed by the processor, the steps of the method for guaranteeing data transmission according to the first aspect are implemented, or the steps of the method for guaranteeing data transmission according to the second aspect are implemented, or the steps of the method for guaranteeing data transmission according to the third aspect are implemented, or the steps of the method for guaranteeing data transmission according to the fourth aspect are implemented, or the steps of the method for guaranteeing data transmission according to the fifth aspect are implemented.

According to a twelfth aspect, an embodiment of this disclosure provides a computer-readable storage medium. The computer-readable storage medium stores a program, and when the program is executed by a processor, the steps of the method for guaranteeing data transmission according to the first aspect are implemented, or the steps of the method for guaranteeing data transmission according to the second aspect are implemented, or the steps of the method for guaranteeing data transmission according to the third aspect are implemented, or the steps of the method for guaranteeing data transmission according to the fourth aspect are implemented, or the steps of the method for guaranteeing data transmission according to the fifth aspect are implemented.

BRIEF DESCRIPTION OF DRAWINGS

Other advantages and benefits will become apparent to those of ordinary skill in the art by reading detailed description of the optional embodiments below. The accompanying drawings are merely intended to illustrate the objectives of the optional embodiments and are not intended to limit this disclosure. Throughout the accompanying drawings, the same reference numerals represent the same components. In the accompanying drawings.

DESCRIPTION OF EMBODIMENTS

The following clearly describes the technical solutions in the embodiments of the present disclosure with reference to the accompanying drawings in the embodiments of the present disclosure. Apparently, the described embodiments are merely a part rather than all of the embodiments of the present disclosure. All other embodiments that a person of ordinary skill in the art obtains without creative efforts based on the embodiments of the present disclosure shall fall within the protection scope of the present disclosure.

The term "include" or any of its variants in the specification and claims of this application are intended to cover a non-exclusive inclusion, such that a process, a method, a system, a product, or a device that includes a series of steps or units not only includes those expressly listed steps or units but also includes other steps or units that are not expressly listed, or further includes elements inherent to such process, method, system, product, or device. In addition, in the specification and claims, the use of "and/or" represents presence of at least one of the connected objects, for example, "A and/or B" indicates the following three cases: A alone, B alone, or both A and B. Similarly, "at least one of A and B" used in this specification and claims should be understood as "A alone, B alone, and both A and B".

In the embodiments of this disclosure, the terms "an example" or "for example" are used to represent an example, an illustration, or a description. Any embodiment or design solution described as "an example" or "for example" in the embodiments of this disclosure should not be construed as preferred or advantageous over other embodiments or design solutions. To be precise, the use of terms such as "an example" or "for example" is intended to present a related concept in a specific manner.

The following describes the embodiments of this disclosure with reference to the accompanying drawings. A method for guaranteeing data transmission and a communications device provided in the embodiments of this disclosure may be applied to a wireless communications system. The wireless communications system may be a 5G system, or an evolved long term evolution (eLTE for short) system, or a subsequent evolved communications system.

Figure 1:
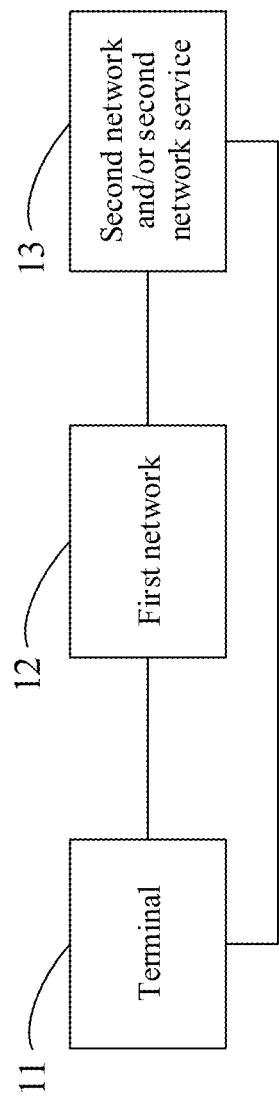
FIG. 1 is a schematic architectural diagram of a wireless communications system according to an embodiment of this disclosure.

Referring to FIG. 1, FIG. 1 is a schematic architectural diagram of a wireless communications system according to an embodiment of this disclosure. As shown in FIG. 1, a terminal 11, a first network 12, and a second network and/or second network service 13 are included, where the second network service may be a network service supported on a network element of the second network, or a network service accessed via the second network. The terminal 11 may access the second network service via the first network 12, or access the second network service via the second network, or access the second network via the second network after accessing the second network via the first network.

Figure 2:
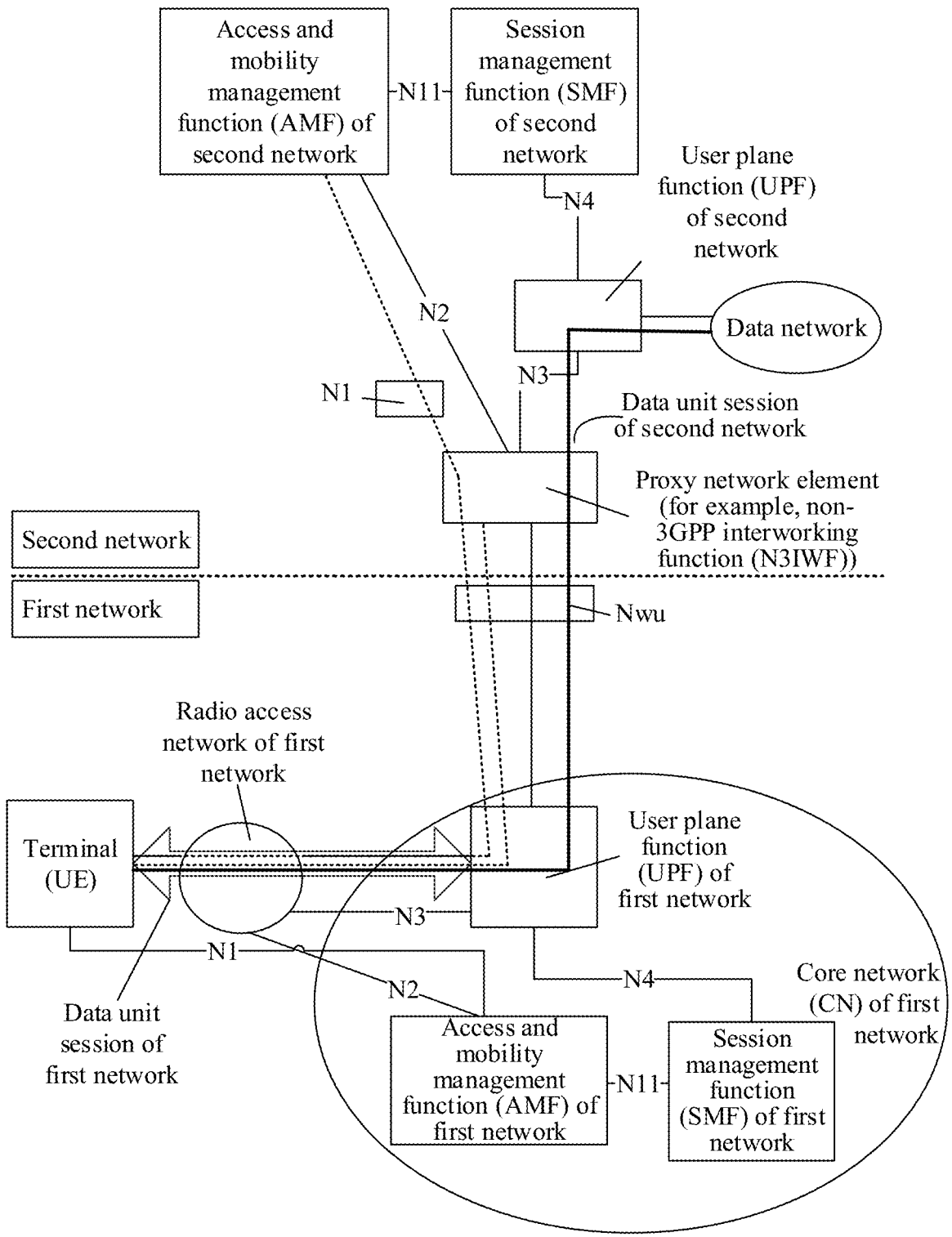
FIG. 2 is a schematic architectural diagram of the wireless communications system shown in FIG. 1 in a specific application scenario.
Figure 3:
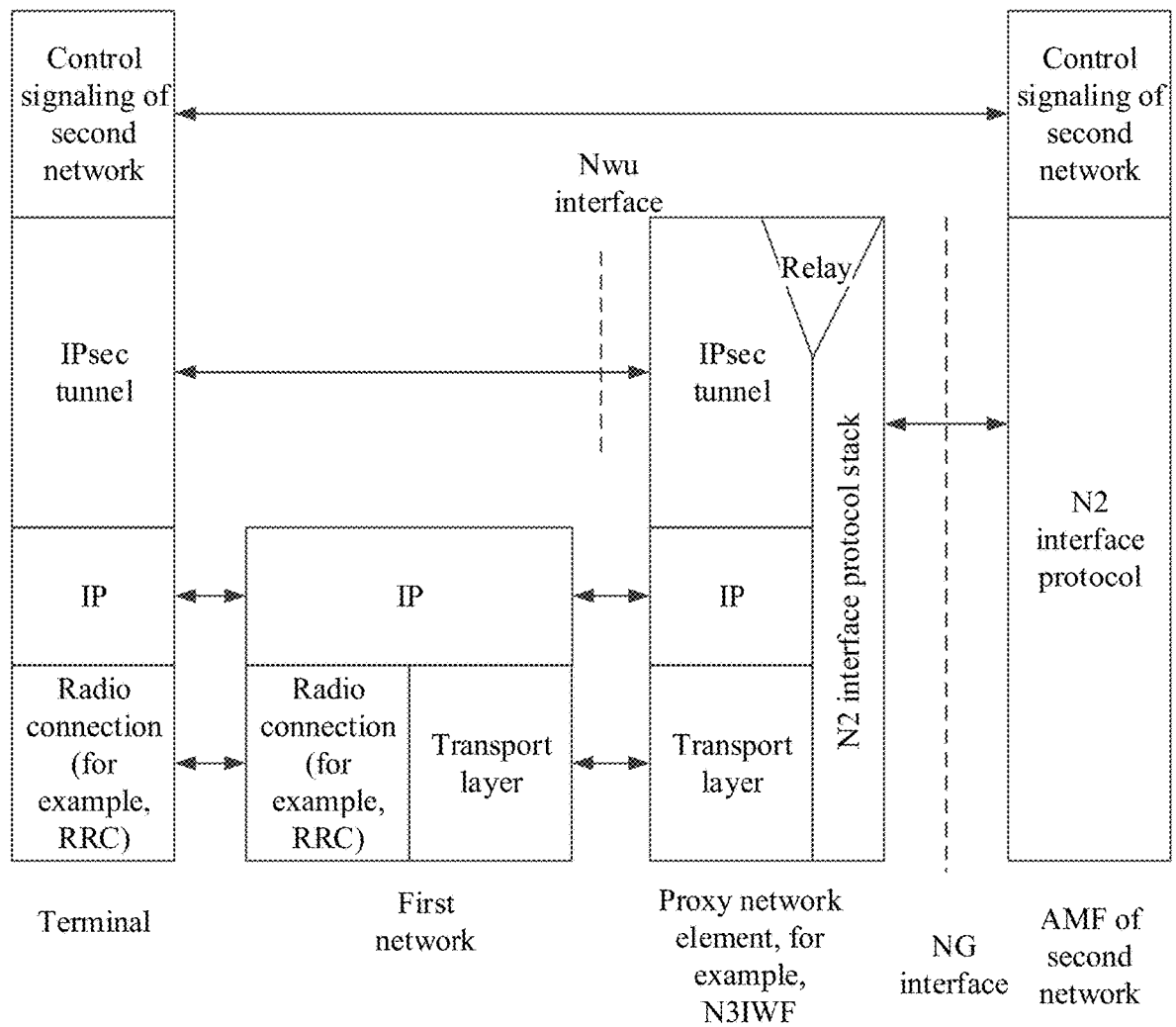
FIG. 3 is a schematic diagram of a transmission mode for transmitting control signaling of a second network via a first network.
Figure 4:
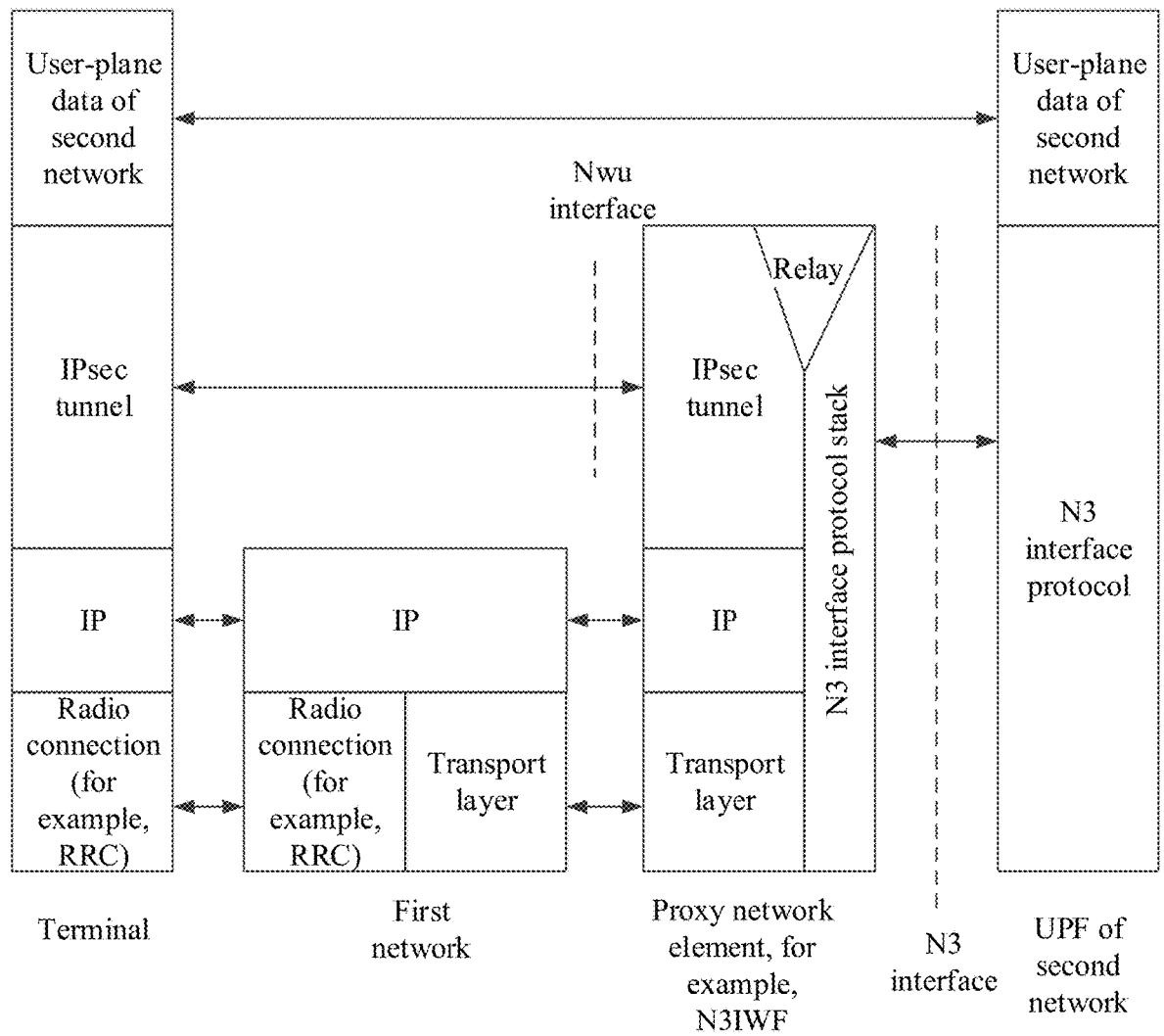
FIG. 4 is a schematic diagram of a transmission mode for transmitting user-plane data of a second network via a first network.

FIG. 2 is a schematic architectural diagram of a wireless communications system shown in FIG. 1 in a specific application scenario. In this application scenario, a terminal (UE) establishes a PDU session channel with a first network to access a proxy network element (such as non-3GPP interworking function (N3IWF)) between the first network and a second network. The terminal establishes an IPsec tunnel with the proxy network element to connect to an access and mobility management function (AMF) and a user plane function (UPF) of the second network. FIG. 3 is a schematic diagram of a transmission mode for transmitting control signaling between a terminal and a second network via a first network. FIG. 4 is a schematic diagram of a transmission mode for transmitting control signaling between a terminal and a second network via a first network. It can be seen from FIG. 3 and FIG. 4 that control signaling between a terminal and the second network is transmitted via an Internet protocol security tunnel (IPsec tunnel).

However, the disadvantage of the architecture in FIG. 2 is that details of data between the terminal and the second network are transparent to the first network, and quality of service (QoS) guarantee cannot be implemented. In addition, there is no control-plane interface between the proxy network element and the first network, and QoS information cannot be provided to the first network. Therefore, performance and reliability of important services (such as IMS voice services or emergency services) cannot be guaranteed.

In order to support access to the second network and/or the service of the second network via the first network by the terminal, the following problems need to be resolved:

Problem 1: Generally, the control signaling is the basis for transmitting user-plane data. However, because in the architecture of FIG. 2, both the control signaling and the user-plane data of the second network are mapped to data of the IPsec tunnel, currently the first network can neither distinguish between the control signaling and the user-plane data of the second network, nor identify which IPsec tunnels are used to transmit the control signaling of the second network, and which IPsec tunnels are used to transmit the user-plane data of the second network.

Problem 2: Data is mapped to different QoS flows by using a QoS guarantee method. Different QoS flows have different QoS parameter requirements. With a QoS parameter requirement of a QoS flow, the effect of guaranteeing data in the QoS flow is achieved. However, the first network can merely learn an IPsec tunnel between the terminal and the proxy network element and a DSCP (Differentiated Services Code Point, differentiated services code point) in an IP header corresponding to the IPsec tunnel. Mapping between the DSCP and QoS of the second network depends on a policy of the second network. The first network neither knows the mapping relationship between DSCPs and QoS information of the second network, nor knows what the QoS information requirement is exactly. For example, a QoS class requirement of voice is 5QI=1, and a corresponding DSCP is not standardized. In addition, there may be a many-to-many mapping relationship between DSCPs and QoS information. A signaling IPsec tunnel does not correspond to a fixed DSCP either.

Problem 3: When accessing the first network, the terminal may access a service of the first network, a service (such as an IMS service) of the second network, or other applications. In order to ensure QoS of the service in the second network, the first network needs some special QoS mapping policies. Currently, with the PDU session established by the terminal, the first network cannot distinguish which data is from the second network and which are data from other applications.

Problem 4: In data monitoring, the first network does not know how to perform monitoring. For example, the first network neither knows an IP address of the N3IWF, nor knows which data comes from N3IWF and requires QoS guarantee.

In the embodiments of this disclosure, optionally, obtaining may be understood as acquiring from configuration, receiving, obtaining through receiving upon a request, obtaining through self-learning, obtaining through deduction based on non-received information, or obtaining through processing received information, which may be determined according to actual needs. This is not limited in the embodiments of this disclosure. For example, when specific capability indication information transmitted by a device is not received, it can be deduced that the device does not support the capability.

Optionally, transmitting may include broadcasting, broadcasting through a system message, or returning a response after receiving the request.

In the embodiments of this disclosure, data between the terminal and the second network (may be referred to as information between the terminal and the second network, data between the terminal and the second network, or data of the second network) may include at least one of the following: control signaling (including NAS signaling) between the terminal and the second network, a paging message of the second network, and user-plane data between the terminal and the second network.

In the embodiments of this disclosure, data between the terminal and the proxy network element (may be referred to as information between the terminal and the proxy network element, data between the terminal and the proxy network element, or data of the proxy network element) may include at least one of the following: signaling IPsec tunnel data, and data IPsec tunnel data.

In some embodiments of this disclosure, the second network tunnel may be understood as a tunnel between the terminal and the second network. A QoS flow of the second network can be understood as a QoS flow between the terminal and the second network. Control signaling of the second network can be understood as control signaling between the terminal and the second network. User-plane data of the second network can be understood as user-plane data between the terminal and the second network.

In some embodiments of this disclosure, a DSCP in data packet related information is included in TOS (IPv4)/TC (IPv6) of an IP packet header. A protocol field of an IP packet is encapsulating security payload (ESP), and an extension header includes a security parameter index (SPI) in the data packet related information.

In some embodiments of this disclosure, a value of a service descriptor component type identifier corresponding to the security parameter index type may be 01100000.

In some embodiments of this disclosure, QoS information includes at least one of the following: QoS class indicator (such as QCI (QoS Class Identifier) or 5QI (5G QoS Identifier)), QoS rule, QoS flow description information, QoS context information, and QoS parameter information.

The QoS flow description information may include QoS parameter information, and the QoS context information may include QoS parameter information.

In some embodiments of this disclosure, the data packet filtering information is included in the QoS rule.

In some embodiments of this disclosure, the QoS parameter information may include at least one of the following: QoS class indicator information, priority information, packet delay budget, packet error rate, maximum data burst, and whether guaranteed bit rate (GBR) is required, whether there is a default average window requirement, default average window, and GBR-related QoS parameter information.

In some embodiments of this disclosure, the tunnel is of a GBR type, indicating that the QoS information of the tunnel includes GBR-related QoS parameters.

In some embodiments of this disclosure, the GBR-related QoS parameter information may include at least one of the following: uplink and/or downlink guaranteed flow bit rate GFBR, uplink and/or downlink maximum flow bit rate MFBR, uplink and/or downlink GBR, and uplink and/or downlink maximum bit rate MBR.

In some embodiments of this disclosure, the QoS information requirement may be one of the following: QoS information and QoS requirement. The QoS information may be one of the following: QoS information requirement and QoS requirement.

In some embodiments of this disclosure, the QoS class indicator may be referred to as 5QI, QCI (QoS class indicator), or other names, which is not limited in this disclosure. 5QI may be used as a QFI (QoS flow identifier).

In some embodiments of this disclosure, the packet filter information may be used to map data onto a tunnel of the network. The packet filter information may also be referred to as TFT, SDF, or other names, which is not specifically limited in this disclosure.

In the embodiments of this disclosure, the data packet filtering information, the packet filter information, and the packet filter may represent the same meaning, and may be used interchangeably. The QoS parameter information and the QoS parameter may represent the same meaning, and may be used interchangeably. The QoS class indicator information and the QoS class indicator may represent the same meaning and may be used interchangeably. The QoS flow description information and the QoS flow description may represent the same meaning and may be used interchangeably. The priority information, QoS priority information, and priority may represent the same meaning and may be used interchangeably.

In some embodiments of this disclosure, a tunnel between the terminal and the second network may be referred to as a second network tunnel for short.

In some embodiments of this disclosure, an emergency service may also be referred to as an emergency voice service.

In some embodiments of this disclosure, a voice service may include an IMS voice service. The IMS voice service may include at least one of the following: IMS voice service via 3GPP and IMS voice service via non-3GPP.

In an optional embodiment of this disclosure, the tunnel may include at least one of the following: a PDU session, a quality of service (QoS) flow, an evolved packet system (EPS) bearer, a packet data protocol (PDP) context, a data radio bearer (DRB), a signaling radio bearer (SRB), and Internet protocol security (IPsec) association.

In some embodiments of this disclosure, the IPsec tunnel may be an IPsec security association (SA). A first IPsec tunnel may be referred to as one of the following: a signaling IPsec SA, a primary IPsec SA, an IPsec SA used for transmitting control signaling, or other names, which is not specifically limited in this disclosure. The data IPsec tunnel may be referred to as one of the following: data IPsec SA, IPsec sub-SA, IPsec SA used for transmitting user-plane data, IPsec SA used for transmitting QoS flow data, or other names, which is not specifically limited in this disclosure.

In some embodiments of this disclosure, the first network may be a public network, and the second network may be a non-public network; or, the first network may be a non-public network, and the second network may be a public network; or, the first network may be a first non-public network, and the second network may be a second non-public network; or, the first network may be a first public network, and the second network may be a second public network.

In some embodiments of this disclosure, the non-public network is an abbreviation of the non-public network. The non-public network may be referred to as one of the following: a non-public communications network. The non-public network may include at least one of the following deployment manners: a physical non-public network, a virtual non-public network, and a non-public network implemented on a public network. In an implementation, the non-public network is a closed access group (CAG). A CAG may include a group of terminals.

In some embodiments of this disclosure, the non-public network service is an abbreviation of the non-public network service. The non-public network service may also be referred to as one of the following: non-public-network network service, non-public communication service, non-public network communication service, non-public-network network service, or other names. It should be noted that the naming manner is not specifically limited in the embodiments of this disclosure. In an implementation, the non-public network is a closed access group, and in this case, the non-public network service is a network service of the closed access group.

In some embodiments of this disclosure, the non-public network may include or be referred to as a private network. The private network may be referred to as one of the following: a private communications network, a private network, a local area network (LAN), a private virtual network (PVN), an isolated communications network, a dedicated communications network, or other names. It should be noted that the naming manner is not specifically limited in the embodiments of this disclosure.

In some embodiments of this disclosure, the non-public network service may include or be referred to as a private network service. The private network service may be referred to as one of the following: private-network network service, private communication service, private network service, private network service, local area network (LAN) service, private virtual network (PVN) service, isolated communication network service, dedicated communication network service, dedicated network service, or other names. It should be noted that the naming manner is not specifically limited in the embodiments of this disclosure.

In some embodiments of this disclosure, the public network is an abbreviation of the public network. The public network may be referred to as one of the following: a public communications network or other names. It should be noted that the naming manner is not specifically limited in the embodiments of this disclosure.

In some embodiments of this disclosure, the public network service is an abbreviation of the public network service. The public network service may also be referred to as one of the following: public-network network service, public communication service, public network communication service, public-network network service, or other names. It should be noted that the naming manner is not specifically limited in the embodiments of this disclosure.

In some embodiments of this disclosure, an NG interface may be also referred to as an S1 interface or an N2 interface, and the naming is not limited.

In some embodiments of this disclosure, the communications network element may include at least one of the following: a core network network element and a radio access network network element.

In the embodiments of this disclosure, a network element of the first network (or referred to as a first-network network element) includes at least one of the following: a core network network element of the first network and a radio access network network element of the first network. A network element of the second network (or referred to as a second network network element) includes at least one of the following: a core network network element of the second network and a radio access network network element of the second network.

In some embodiments of this disclosure, a first network tunnel is a tunnel established between the terminal and the first network.

In some embodiments of this disclosure, a second network tunnel is a tunnel established between the terminal and the second network.

In some embodiments of this disclosure, a mapping relationship between DSCPs and the QoS information is a mapping relationship between DSCPs and QoS information in the second network.

In some embodiments of this disclosure, QoS information mapped to a DSCP is QoS information obtained based on the DSCP and the mapping relationship between DSCPs and QoS information.

In some embodiments of this disclosure, separate and independent may represent the same meaning and may be used interchangeably.

In an optional embodiment of this disclosure, the communications device may include at least one of the following: a communications network element and a terminal.

In some embodiments of this disclosure, the communications network element may include at least one of the following: a core network network element and a radio access network network element.

In the embodiments of this disclosure, a core-network network element (CN network element) may include but is not limited to at least one of the following:

a core network device, a core network node, a core network function, a core-network network element, a mobility management entity (MME), an access mobility management function (AIVIF), a session management function (SMF), a user plane function (UPF), a serving gateway (SGW), a PDN gateway (PDN-GW), a policy control function (PCF), a policy and charging rules function (PCRF), a serving GPRS support node (SGSN), a gateway GPRS support node (GGSN), a unified data management (UDM), a unified data repository (UDR), a home subscriber server (HSS), and an application function (AF).

In the embodiments of this disclosure, the RAN network element may include but is not limited to at least one of the following: a radio access network device, a radio access network node, a radio access network function, a radio access network network element, a 3GPP radio access network, a non-3GPP radio access network, a centralized unit (CU), a distributed unit (DU), a base station, an evolved NodeB (eNB), a 5G NodeB (gNB), a radio network controller (RNC), a NodeB (NodeB), a non-3GPP interworking function (N3IWF), an access controller (AAC) node, an access point (AP) device, a wireless local area network (WLAN) node, or an N3IWF.

In the embodiments of this disclosure, the proxy network element is a proxy network element via which the first network and the second network interacts, for example, an N3IWF. The proxy network element may be a network element of the first network or the second network.

A base station may be a base transceiver station (BTS) in GSM or CDMA, or may be a NodeB in WCDMA, or may be an evolved NodeB (eNB or e-Node B) in LTE or a 5G NodeB (gNB), which is not limited in the embodiments of this disclosure.

In the embodiments of this disclosure, the terminal may include a relay supporting terminal functions and/or a terminal supporting relay functions. The terminal may also be referred to as a terminal device or user equipment (UE). The terminal may be a terminal-side device such as a mobile phone, a tablet computer (Tablet Personal Computer), a laptop computer, a personal digital assistant (PDA), a mobile Internet device (MID), a wearable device, or an in-vehicle device. It should be noted that a specific type of the terminal is not limited in the embodiments of this disclosure.

The following describes the method for guaranteeing data transmission in the embodiments of this disclosure.

Figure 5:
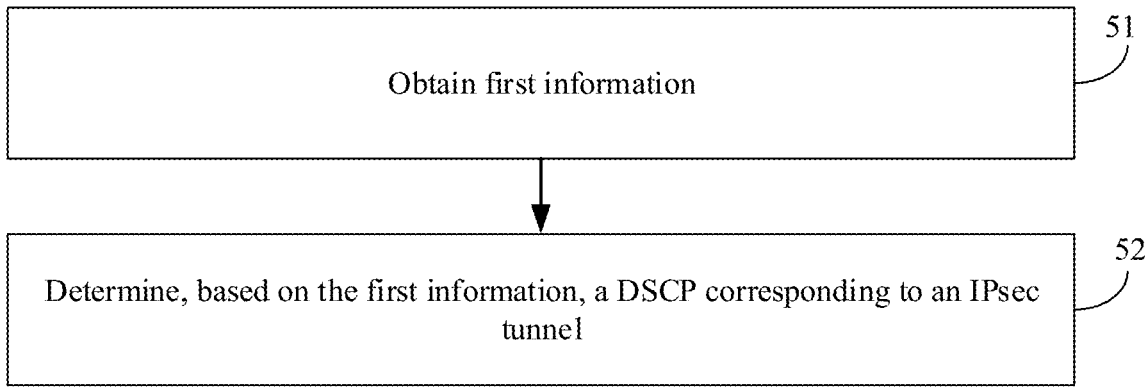
FIG. 5 is a schematic flowchart of a method for guaranteeing data transmission according to some embodiments of this disclosure.

Referring to FIG. 5, an embodiment of this disclosure provides a method for guaranteeing data transmission, applied to a first communications device. The first communications device includes but is not limited to at least one of the following: a proxy network element (such as an N3IWF of a second network). The method includes steps 51 and 52.

Step 51: Obtain first information.

The first information includes at least one of the following:

QoS information of a second network tunnel;
data type information;
a mapping relationship between DSCPs and QoS information;
a first QoS information requirement; and
a first DSCP.

The first QoS information requirement is a QoS information requirement for control signaling or signaling IPsec tunnel data.

The data type information includes at least one of the following: control signaling of a second network, user-plane data of the second network, signaling IPsec tunnel data, and data IPsec tunnel data.

The first DSCP is a DSCP associated with control signaling or a signaling IPsec tunnel.

Step 52: Determine, based on the first information, a DSCP corresponding to an IPsec tunnel.

The IPsec tunnel is an IPsec tunnel between a terminal and the proxy network element.

The second network tunnel is a tunnel established between the terminal and the second network, such as a QoS flow.

The control signaling of the second network is control signaling between the terminal and the second network, such as NAS signaling.

The DSCP corresponding to the IPsec tunnel is a DSCP in an IP header of the IPsec tunnel.

The proxy network element is a proxy network element via which the first network and the second network interacts, for example, an N3IWF. The proxy network element may be a network element of the first network or the second network.

Optionally, the mapping relationship between DSCPs and QoS information may be a one-to-one mapping relationship between DSCPs and QoS information. The DSCP and the QoS information may be information preconfigured in the first communications device.

Further, the mapping relationship between DSCPs and QoS information includes: a mapping relationship between DSCPs and QoS class indicators (such as 5QI or QCI). In an implementation, QoS class indicators are mapped to DSCPs in a one-to-one manner. That is, different QoS class indicators indicate different DSCPs. It is not difficult to understand that a QoS class indicator corresponding to a DSCP can be deduced from the mapping relationship between DSCPs and QoS class indicators. In an implementation, DSCPs for one-to-one mapping are set only for standardized QoS class indicators. In another implementation, DSCPs for one-to-one mapping are set only for GBR-type QoS information.

Optionally, the determining a DSCP corresponding to an IPsec tunnel includes at least one of the following:

setting a DSCP corresponding to signaling IPsec tunnel as the first DSCP;

mapping a separate DSCP for each IPsec tunnel;

mapping a separate DSCP for each IPsec tunnel, where a second network tunnel associated with the IPsec tunnel is of a GBR type; and mapping a separate DSCP for each IPsec tunnel, where QoS information of the second network tunnel associated with the IPsec tunnel is at least one of the following: standardized QoS information, high-priority service QoS information, a QoS class indicator being 1, a QoS class indicator being 5, and a QoS class indicator being 69.

In an implementation, the mapping a separate DSCP for each IPsec tunnel may be mapping different DSCPs for different IPsec tunnels.

In this embodiment of this disclosure, duration establishment of an IPsec tunnel, the proxy network element may determine a separate DSCP for the IPsec tunnel, such as a GBR-type QoS flow, an important high priority service (MPS) QoS flow, voice service QoS flow of 5QI=1 or 5QI=5, so that the terminal can request the first network for a separate first network tunnel, to implement QoS guarantee.

(1) Optionally, the determining, based on the first information, a DSCP corresponding to an IPsec tunnel includes at least one of the following:

based on the QoS information of the second network tunnel and/or the mapping relationship between DSCPs and QoS information, determining the DSCP corresponding to the IPsec tunnel, where the second network tunnel is a second network tunnel associated with the IPsec tunnel;

setting, based on the first information, a DSCP corresponding to a signaling IPsec tunnel as the first DSCP; and based on the mapping relationship between DSCPs and QoS information and/or the first QoS information requirement, setting the DSCP corresponding to the signaling IPsec tunnel as a DSCP corresponding to QoS information that is in the first QoS information requirement.

In an implementation, setting the DSCP corresponding to the IPsec tunnel as a DSCP mapped to the QoS information of the second network tunnel includes: based on the mapping relationship between DSCPs and QoS information and QoS information of a second network tunnel corresponding to a data IPsec tunnel, setting a DSCP corresponding to a data IPsec tunnel as the DSCP mapped to the QoS information of the second network tunnel.

In an implementation, the setting a DSCP corresponding to a signaling IPsec tunnel as the first DSCP includes: setting the DSCP corresponding to a signaling IPsec tunnel as the first DSCP based on a mapping relationship between first DSCPs and control signaling. The first DSCP may be a DSCP specially used for signaling IPsec tunnel data or control signaling data. The first DSCP may be a highest-priority DSCP. The first DSCP may be mapped to one piece of QoS information. The QoS information mapped to the first DSCP may be QoS information unique to the second network, or standardized QoS information.

It is not difficult to understand that based on the first DSCP, at least one of the following can be deduced: data related to the first DSCP (such as data between the terminal and the second network) being control signaling, and an IPsec tunnel related to the first DSCP being the signaling IPsec tunnel, and a QoS guarantee requirement of the control signaling of the second network (such as control information corresponding to the first DSCP).

In an implementation, the signaling IPsec tunnel is an IPsec tunnel between the terminal and the proxy network element, where the IPsec tunnel is used for transmitting control signaling between the terminal and the second network.

In an implementation, the data IPsec tunnel is an IPsec tunnel between the terminal and the proxy network element, where the IPsec tunnel is used for transmitting user-plane data between the terminal and the second network, or used for transmitting data of the second network tunnel. The data IPsec tunnel may also be referred to as an IPsec sub-tunnel. The data IPsec tunnel may be associated with the terminal and the second network tunnel.

Specifically, as described above, the QoS information includes, for example, a QoS class indicator (such as 5QI or QCI).

Specifically, the QoS information requirement includes QoS information.

In an implementation, the determining, based on the first information, the DSCP corresponding to the IPsec tunnel may be: in a case that a preset condition is met, determining, based on the first information, the DSCP corresponding to the IPsec tunnel.

Optionally, the preset condition includes at least one of the following:

that the first communications device is used for a terminal to access the second network via a first network;

that the first network supports QoS guarantee;

that the first communications device is of a 3GPP access type;

that the first network is a 3GPP type network, and a request for establishment of a tunnel between the terminal and the second network is received;

that a request for modification of a tunnel between the terminal and the second network is received;

that an operation of mapping from a tunnel between the terminal and the second network to an IPsec tunnel is performed; and that the IPsec tunnel is established.

In some embodiments of this disclosure, receiving a request for establishment of a tunnel between the terminal and the second network: receiving request for establishment or modification of a PDU session for the second network, or receiving a request for establishment of a QoS flow for the second network. In some embodiments of this disclosure, receiving a request for modification of a tunnel between the terminal and the second network is: receiving a request for modification of a PDU session for the second network, or receiving a request for modification of a QoS flow for the second network.

In this embodiment of this disclosure, optionally, the tunnel between the terminal and the second network tunnel is a QoS flow of the second network.

It is not difficult to understand that, on the basis that the proxy network element determines, based on the QoS information of the second network tunnel mapped to the IPsec tunnel, the DSCP corresponding to the IPsec tunnel, the first network can obtain the QoS information of the second network tunnel based on the DSCP, and the first network can further perform, based on the QoS information, QoS guarantee on the data of the IPsec tunnel mapped to the second network tunnel, to guarantee the data of the second network, thereby implementing an effect that the data of the second network or the service of the second network service can be guaranteed via the first network.

Figure 6:
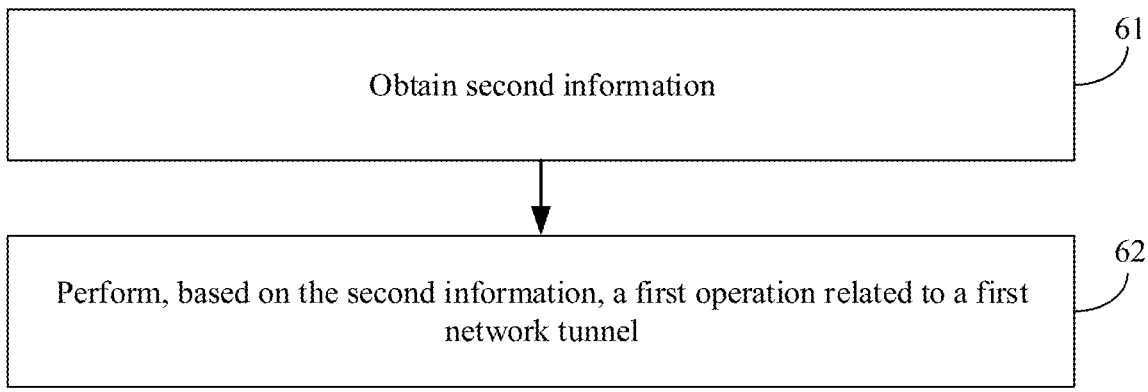
FIG. 6 is a schematic flowchart of a method for guaranteeing data transmission according to some other embodiments of this disclosure.

Referring to FIG. 6, an embodiment of this disclosure further provides a method for guaranteeing data transmission, applied to a second communications device. The second communications device includes but is not limited to a communications network element of a first network (such as a UPF, a PCF, an SMF, or an AMF). The method includes steps 61 and 62.

Step 61: Obtain second information.

The second information includes at least one of the following: data packet related information of first data, a first data network name (DNN), GBR-related QoS parameter information of a first network tunnel, a mapping policy of the first network tunnel, a mapping relationship between DSCPs and QoS information, and data monitoring information.

It can be understood that the first data may be data received by a second communications device, for example, data received from a terminal and/or a proxy network element. The first data may be data between the terminal and the proxy network element, or data between the terminal and a second network.

Step 62: Perform, based on the second information, a first operation related to the first network tunnel.

Specifically, the first network tunnel is a tunnel established between the terminal and the first network, such as a QoS flow.

Specifically, the GBR-related QoS parameter information is described above.

In an implementation, the first network tunnel is a QoS flow. The first network tunnel may be a QoS flow in a first tunnel (such as a first PDU session).

In an implementation, after the first data is received, the data packet related information of the first data is obtained from the first data.

Optionally, the data packet related information includes at least one of the following: DSCP, SPI (which may be used as an identifier of the IPsec tunnel), a first DSCP, and a second DSCP. Information included in the data package related information of the first data may be the same as the data package related information.

In an implementation, the DSCP is associated with the SPI. The association between the DSCP and the SPI may be that the DSCP and the SPI are located in the same data packet. The SPI may be used to identify the IPsec tunnel. Data of the DSCP is a value of a DSCP field, and is a data packet of the DSCP.

In an implementation, the data packet related information is any one of the following: data packet related information of data between the terminal and the second network, data packet related information of data in a first PDU session (for example, data related to an IP address of the first PDU session), and data packet related information of data in the first network tunnel.

Specifically, the first PDU session is a PDU session established between the terminal and the first network and used for transmitting data between the terminal and the second network or data between the terminal and the proxy network element. In an implementation, the first PDU session is a PDU session that the terminal requests the first network based on the first DNN to establish.

(1) Further, the DSCP may be used to indicate at least one of the following:

IPsec tunnel; and

QoS information (such as a QoS class indicator) mapped to the DSCP.

It is not difficult to understand that different IPsec tunnels may have different DSCP values, and different IPsec tunnels can be distinguished by different DSCPs. In an implementation, the DSCP may be used as an identifier of the IPsec tunnel.

Specifically, the QoS information mapped to the DSCP may include at least one of the following:

QoS information (such as a QoS class indicator) of the second network;

a QoS information requirement (which is QoS information) of the IPsec tunnel; and QoS information of a second network tunnel (such as a QoS flow) associated with the IPsec tunnel.

In an implementation, the IPsec tunnel may be an IPsec tunnel indicated by an SPI that is associated with the DSCP.

In an implementation, different second networks corresponding to the same DSCP may have different QoS information. In one implementation, different first DNNs correspond to different second networks. QoS information mapped to an indicated DSCP may be determined based on the DSCP and the first DNN.

Specifically, a DSCP and an SPI associated with a first DSCP (such as a DSCP and an SPI in the same data packet) may indicate at least one of the following: that a QoS information requirement of the IPsec tunnel indicated by the SPI is the QoS information mapped to the DSCP, and that a QoS information requirement of a second network tunnel associated with the IPsec tunnel indicated by the SPI is the QoS information mapped to the DSCP.

Further, the DSCP may include at least one of the following: a first DSCP and a second DSCP.

(2) Further, the first DSCP is a DSCP associated with control signaling or a signaling IPsec tunnel. The first DSCP may be located at a DSCP position in an IP header of signaling IPsec tunnel data. The first DSCP may be used to indicate at least one of the following:

signaling IPsec tunnel;

control signaling (such as non-access stratum NAS signaling); and

QoS information mapped to the first DSCP.

In an implementation, the control signaling may be control signaling of the second network, or control signaling between the terminal and the second network.

In an implementation, the signaling IPsec tunnel may include one of the following: a signaling IPsec tunnel between the terminal and the proxy network element, an IPsec tunnel indicated by the first DSCP, and an IPsec tunnel indicated by the SPI that is associated with the first DSCP.

Specifically, the QoS information mapped to the first DSCP may include at least one of the following:
a QoS information requirement of the signaling IPsec tunnel; and
a QoS information requirement of the control signaling.

In an implementation, first DSCPs of different second networks may be different. In one implementation, different first DNNs correspond to different second networks. The first DSCP indicating the second network may be determined based on the first DSCP and the first DNN.

In an implementation, in data received or sent in the first PDU session, the first DSCP is located in the IP header of the signaling IPsec tunnel data, with a value different from that of the second DSCP. The first PDU session is described above.

Specifically, the first DSCP and the SPI associated with the first DSCP(which are the first DSCP and the SPI that are in the same data packet) may indicate: that the IPsec tunnel indicated by the SPI is a signaling IPsec tunnel, and that a QoS information requirement corresponding to the signaling IPsec tunnel is the QoS information mapped to the first DSCP.

(3) Further, the second DSCP is a DSCP associated with user-plane data or a data IPsec tunnel. The second DSCP may be located in an IP header (such as TOS (IPv4)/TC (IPv6) of the data IPsec tunnel. The second DSCP may be used to indicate at least one of the following:
a data IPsec tunnel;
user-plane data of the second network; and
QoS information mapped to the second DSCP.

In an implementation, the data IPsec tunnel may include one of the following: a data IPsec tunnel between the terminal and the proxy network element, an IPsec tunnel indicated by the second DSCP, and an IPsec tunnel indicated by the SPI that is associated with the second DSCP.

Specifically, the QoS information mapped to the second DSCP may include at least one of the following:
a QoS information requirement (which is QoS information) of the data IPsec tunnel; and
QoS information of a second network tunnel (such as a QoS flow) associated with the data IPsec tunnel.

In an implementation, in data received or sent in the first PDU session, the second DSCP is located in the IP header of the data IPsec tunnel data, with a value different from that of the first DSCP. The first PDU session is described above.

Specifically, a second DSCP and an SPI associated with a second DSCP (such as a second DSCP and an SPI in the same data packet) may indicate at least one of the following: that a QoS information requirement corresponding to the IPsec tunnel indicated by the SPI is the QoS information mapped to the second DSCP, and that a QoS information requirement of a second network tunnel associated with the IPsec tunnel indicated by the SPI is the QoS information mapped to the second DSCP.

Optionally, a mapping policy of the first network tunnel may include at least one of the following: mapping different first network tunnels to different IPsec tunnels;
mapping a separate first network tunnel to the signaling IPsec tunnel;
mapping different first network tunnels to different data IPsec tunnels;
mapping different first network tunnels to different DSCPs;
mapping different first network tunnels to IPsec tunnels that are corresponding to different DSCPs;
setting the QoS information of the mapped first network tunnel as the QoS information mapped to the DSCP; and making an agreement between a first network operator and a second network operator.

Optionally, the agreement between the first network operator and the second network operator may include at least one of the following: IP triplet information of the proxy network element (such as an N3IWF of the second network), whether the second network requires different QoS, whether the second network requires QoS guarantee, and a mapping relationship between DSCPs and QoS (for example, a mapping relationship between DSCPs and QoS in the second network).

In an implementation, the agreement between the first network operator and the second network operator is an agreement (that is, inter-operator agreement) between the second network operator and the first network operator related to the second network or proxy network element to which access is performed via the first network. Optionally, at least one of the following may be determined based on the first DNN and/or the agreement between the first network operator and the second network operator: the mapping relationship between DSCPs and QoS information, the mapping policy of the first network tunnel, and data monitoring information (such as data packet flow description PFD, Packet Flow Description). The data monitoring information may be used for monitoring first data by the gateway (such as a PDU session of a first tunnel). It is not difficult to understand that when a new DSCP or a new SPI is detected, data packet related information of the first data is notified to an SMF. The SMF transmits the data packet related information of the first data to a PCF. The PCF may determine, based on the first DNN and/or the data packet related information of the first data, whether to establish the first network tunnel and how to configure QoS information and/or data packet filtering information of the first network tunnel. The new DSCP means that there is still no first network tunnel (such as a QoS flow) corresponding to the DSCP in the first tunnel (such as the first PDU session), or data packet filtering information of an existing first network tunnel does not include the DSCP. The new SPI means that there is still no first network tunnel (such as a QoS flow) corresponding to the SPI in the first tunnel (such as the first PDU session), or data packet filtering information of an existing first network tunnel does not include the SPI.

Optionally, the data monitoring information includes at least one of the following: a data monitoring information identifier (such as a PFD ID), triplet information of the proxy network element, an important portion of a URL to be matched, domain name matching condition, and information related to an applicable protocol.

Further, the triplet information of the proxy network element may include at least one of the following: a target IP address or IPv6 network prefix (a target IP address or IPv6 network prefix of the proxy network element), a target port number (a target port number of the proxy network element), and a protocol identifier of the protocol above IP (protocol ID of the protocol above IP). The protocol identifier of the protocol over IP may be ESP. The ESP corresponds to a protocol of the IPsec tunnel. The protocol identifier may also be referred to as a protocol field. Further, the data monitoring information may be data monitoring information of the first PDU session. In an implementation, the determined data monitoring information is sent to the UPF of the first PDU session, and the data packet related information of the first data is obtained through monitoring by the UPF based on the data monitoring information.

Optionally, the performing a first operation related to the first network tunnel includes at least one of the following:

determining a QoS information requirement of the first data;
determining a QoS information requirement of an IPsec tunnel;
determining that the first data is data of a signaling IPsec tunnel;
determining that the first data is data of a data IPsec tunnel;
determining that the IPsec tunnel is a signaling IPsec tunnel;
determining that the IPsec tunnel is a data IPsec tunnel;
determining data monitoring information; and
performing a mapping operation for the first network tunnel.

(1) Further, the determining the QoS information requirement of the first data includes: determining that the QoS information requirement of the first data is the QoS information mapped to the DSCP.

Further, the determining a QoS information requirement of an IPsec tunnel includes at least one of the following:
determining that a QoS information requirement of an IPsec tunnel indicated by the SPI is QoS information mapped to the DSCP;
determining that a QoS information requirement of a signaling IPsec tunnel is QoS information mapped to the first DSCP; and
determining that a QoS information requirement of a data IPsec tunnel is QoS information mapped to the second DSCP.

In an implementation, the QoS information requirement of the first data may be determined based on the DSCP.

In an implementation, the QoS information requirement of the IPsec tunnel may be determined based on the DSCP and/or the SPI.

In an implementation, the QoS information requirement of the signaling IPsec tunnel may be determined based on the first DSCP and/or the SPI.

Specifically, the QoS information requirements of the signaling IPsec tunnel include: a QoS information requirement of the control signaling of the second network. It is not difficult to understand that because the signaling IPsec tunnel includes the control signaling of the second network, the QoS information requirement of the IPsec tunnel may be the QoS information of the control signaling of the second network.

In an implementation, the QoS information requirement of the data IPsec tunnel may be determined based on the second DSCP and/or the SPI.

Specifically, the QoS information requirement of the data IPsec tunnel includes: the QoS information of the second network tunnel. It is not difficult to understand that because the data IPsec tunnel includes data of the second network, the QoS information requirement of the IPsec tunnel may be the QoS information of the second network tunnel.

(2) Further, the determining, based on the second information, that the first data is data of a signaling IPsec tunnel includes: determining, based on the first DSCP, that the first data is data of a signaling IPsec tunnel.

Specifically, the determining that the first data is data of a signaling IPsec tunnel includes: determining that the first data is the control signaling of the second network.

(3) Further, the determining, based on the second information, that the first data is data of a data IPsec tunnel includes: determining, based on the second DSCP, that the first data is data of a data IPsec tunnel.

In an implementation, it can be determined, based on the second DSCP and the SPI, that the IPsec tunnel indicated by the SPI is a data IPsec tunnel.

Specifically, the determining that the first data is data of a data IPsec tunnel includes: determining that the first data is the user-plane data of the second network. It is not difficult to understand that the user-plane data of the second network is in the data IPsec tunnel. When it is determined that the first data is data of a data IPsec tunnel, it can be determined that the first data is the user-plane data of the second network.

(4) Optionally, the determining that the IPsec tunnel is a signaling IPsec tunnel includes: determining, based on the first DSCP and the SPI, that the IPsec tunnel indicated by the SPI is a signaling IPsec tunnel.

(5) Optionally, the determining that the IPsec tunnel is a data IPsec tunnel includes: determining, based on the second DSCP and the SPI, that the IPsec tunnel indicated by the SPI is a data IPsec tunnel.

In this embodiment of this disclosure, optionally, the performing the mapping operation for the first network tunnel includes at least one of the following:
performing a mapping operation for a first network tunnel related to the IPsec tunnel; and
performing a mapping operation for a first network tunnel related to the DSCP.

(1) Optionally, the performing the mapping operation for the first network tunnel related to the IPsec tunnel includes at least one of the following:
mapping different first network tunnels to different IPsec tunnels;
determining data packet filtering related information for the first network tunnel mapped to the IPsec tunnel;
determining QoS information of the first network tunnel mapped to the IPsec tunnel;
performing a mapping operation for a first network tunnel related to the signaling IPsec tunnel; and
performing a mapping operation for a first network tunnel related to the data IPsec tunnel.

In an implementation, the data packet filtering information of the first network tunnel mapped to the IPsec tunnel is set to one of the following: an SPI of the IPsec tunnel and a DSCP associated with the IPsec tunnel.

In an implementation, a type of the data packet filtering information of the first network tunnel mapped to the IPsec tunnel is set to one of the following: a DSCP type and an SPI type.

Further, the determining, based on the second information, the QoS information of the first network tunnel mapped to the IPsec tunnel includes at least one of the following:
setting the QoS information of the first network tunnel mapped to the IPsec tunnel to be QoS information mapped to the DSCP associated with the IPsec tunnel; and
determining, based on the DSCP, the first DNN, and the mapping policy of the first network tunnel, the QoS information of the first network tunnel mapped to the IPsec tunnel.

(1.1) Further, the performing the mapping operation for the first network tunnel related to the signaling IPsec tunnel includes at least one of the following:
mapping a separate first network tunnel to the signaling IPsec tunnel;
determining data packet filtering related information for the first network tunnel mapped to the signaling IPsec tunnel; and determining QoS information of the first network tunnel mapped to the signaling IPsec tunnel.

Further, the determining the data packet filtering related information for the first network tunnel mapped to the signaling IPsec tunnel includes at least one of the following:

setting the data packet filtering information of the first network tunnel mapped to the signaling IPsec tunnel to one of the following: the first DSCP, and the SPI of the signaling IPsec tunnel; and setting a type of the data packet filtering information of the first network tunnel mapped to the signaling IPsec tunnel to one of the following: a DSCP type and an SPI type.

Further, the determining the QoS information of the first network tunnel mapped to the signaling IPsec tunnel includes at least one of the following:

setting the QoS information of the first network tunnel mapped to the signaling IPsec tunnel as the QoS information mapped to the first DSCP; and determining, based on the first DSCP, the first DNN, and the mapping policy of the first network tunnel, the QoS information of the first network tunnel mapped to the signaling IPsec tunnel.

Specifically, the SPI of the signaling IPsec tunnel and the first DSCP may be data packet related information of the same data.

In an implementation, the first network tunnel mapped to the signaling IPsec tunnel may be merely used to transmit the data of the signaling IPsec tunnel or the control signaling of the second network.

In an implementation, the determining, based on the first DSCP and the mapping policy of the first network tunnel, the QoS information of the first network tunnel mapped to the signaling IPsec tunnel. Specifically, the mapping policy of the first network tunnel is a tunnel mapping policy determined based on the first DNN.

(1.2) Further, the performing the mapping operation for the first network tunnel related to the data IPsec tunnel includes at least one of the following:

mapping different first network tunnels to different data IPsec tunnels;

determining data packet filtering related information for the first network tunnel mapped to the data IPsec tunnel; and determining QoS information of the first network tunnel mapped to the data IPsec tunnel.

Further, the determining the data packet filtering related information for the first network tunnel mapped to the data IPsec tunnel includes at least one of the following:

setting the data packet filtering information of the first network tunnel mapped to the data IPsec tunnel to one of the following: the second DSCP, and the SPI of the data IPsec tunnel; and setting a type of the data packet filtering information of the first network tunnel mapped to the data IPsec tunnel to one of the following: a DSCP type and an SPI type.

Specifically, the SPI of the data IPsec tunnel and the second DSCP may be data packet related information of the same data.

Further, the determining the QoS information of the first network tunnel mapped to the data IPsec tunnel includes at least one of the following:

setting the QoS information of the first network tunnel mapped to the data IPsec tunnel as the QoS information mapped to the second DSCP; and determining, based on the second DSCP, the first DNN, and the mapping policy of the first network tunnel, the QoS information of the first network tunnel mapped to the data IPsec tunnel.

(2) Further, the performing the mapping operation for the first network tunnel related to the DSCP includes at least one of the following:

mapping different first network tunnels to different DSCPs;

mapping different first network tunnels to IPsec tunnels that are corresponding to different DSCPs;

determining data packet filtering related information for the first network tunnel mapped to the DSCP;

determining QoS information of the first network tunnel mapped to the DSCP;

performing a mapping operation for a first network tunnel related to the first DSCP; and performing a mapping operation for a first network tunnel related to the second DSCP.

Further, the determining the data packet filtering related information for the first network tunnel mapped to the DSCP includes at least one of the following:

setting the data packet filtering information of the first network tunnel mapped to the DSCP to one of the following: the SPI associated with the DSCP, and the DSCP; and setting a type of the data packet filtering information of the first network tunnel mapped to the DSCP to one of the following: a DSCP type and an SPI type.

Further, the determining the QoS information of the first network tunnel mapped to the DSCP includes: setting the QoS information of the first network tunnel mapped to the DSCP as the QoS information mapped to the DSCP.

(2.1) Further, the performing the mapping operation for the first network tunnel related to the first DSCP includes at least one of the following:

mapping a separate first network tunnel to the data (such as the data between the terminal and the second network) corresponding to the first DSCP;

mapping a separate first network tunnel to the IPsec tunnel corresponding to the first DSCP;

determining data packet filtering related information for the first network tunnel mapped to the first DSCP;

determining QoS information of the first network tunnel mapped to the first DSCP.

Further, the determining the data packet filtering related information for the first network tunnel mapped to the first DSCP includes at least one of the following:

setting the data packet filtering information of the first network tunnel mapped to the first DSCP to one of the following: the SPI associated with the first DSCP, and the first DSCP; and setting a type of the data packet filtering information of the first network tunnel mapped to the first DSCP to one of the following: a DSCP type and an SPI type.

Further, the determining the QoS information of the first network tunnel mapped to the first DSCP includes at least one of the following:

setting the QoS information of the first network tunnel mapped to the first DSCP as the QoS information mapped to the first DSCP; and determining, based on the first DSCP, the first DNN, and the mapping policy of the first network tunnel, the QoS information of the first network tunnel mapped to the first DSCP.

In an implementation, the first network tunnel mapped to first DSCP may be merely used to transmit the data of the signaling IPsec tunnel or the control signaling of the second network.

In an implementation, the mapping policy of the first network tunnel is a policy that is determined by the first network for the first DNN.

(2.2) Further, the performing the mapping operation for the first network tunnel related to the second DSCP includes at least one of the following:

mapping different first network tunnels for data of different second DSCPs;

mapping different first network tunnels to IPsec tunnels that are corresponding to different second DSCPs;

determining data packet filtering related information for the first network tunnel mapped to the second DSCP; and determining QoS information of the first network tunnel mapped to the second DSCP.

Further, the determining the data packet filtering related information for the first network tunnel mapped to the second DSCP includes at least one of the following:

setting the data packet filtering information of the first network tunnel mapped to the second DSCP to one of the following: the SPI associated with the second DSCP, and the second DSCP; and setting a type of the data packet filtering information of the first network tunnel mapped to the second DSCP to one of the following: a DSCP type and an SPI type.

Further, the determining the QoS information of the first network tunnel mapped to the second DSCP includes at least one of the following:

setting the QoS information of the first network tunnel mapped to the second DSCP as the QoS information mapped to the second DSCP; and determining, based on the second DSCP, the first DNN, and the mapping policy of the first network tunnel, the QoS information of the first network tunnel mapped to the second DSCP.

In an implementation, the mapping policy of the first network tunnel is a policy that is determined by the first network for the first DNN.

It is not difficult to understand that with the DSCP and the SPI, whether the IPsec tunnel corresponding to the SPI is the control signaling or the user-plane data and respective corresponding QoS information requirements can be determined. Also, the mapping relationship between DSCPs and QoS information, a rule for mapping the DSCP to the first network tunnel, and a rule for mapping the IPsec tunnel to the first network tunnel can be obtained based on the first DNN. In addition, mapping the IPsec tunnel data or the second network data to the first network tunnel can be determined, and QoS guarantee can be implemented for control information of the second network and the data of the IPsec tunnel mapped to the second network tunnel, thereby ensuring the data of the second network. Finally, guaranteeing the data of the second network or the second network service via the first network can be implemented.

Figure 7:
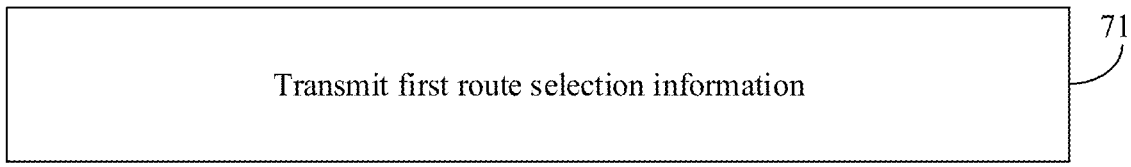
FIG. 7 is a schematic flowchart of a method for guaranteeing data transmission according to still some other embodiments of this disclosure.

Referring to FIG. 7, an embodiment of this disclosure provides a method for guaranteeing data transmission, applied to a third communications device. The third communications device includes but is not limited to at least one of the following: a core network network element (such as a core network network element (for example, a PCF or an AMF) of a first network. The method includes:

Step 71: Transmit first route selection information.

The first route selection information includes at least one of the following: a first DNN and first traffic description information (Traffic descriptor).

(1) The first traffic description information is IP description information of a proxy network element. The proxy network element may be a proxy network element between the first network and the second network. The proxy network element is a proxy network element via which the first network and the second network interacts, for example, an N3IWF. The proxy network element may be a network element (for example, an N3IWF) of the first network or the second network.

Further, the IP description information of the proxy network element may be IP triplet information: a target IP address or IPv6 network prefix (an IP address or IPv6 network prefix of the proxy network element), a target port number (a target port number of the proxy network element), and a protocol identifier of the protocol above IP (protocol ID of the protocol above IP). The protocol identifier of the protocol over IP may be ESP. The ESP corresponds to a protocol of the IPsec tunnel. The protocol identifier may also be referred to as a protocol field (Protocol field).

(2) The first DNN is one of the following:

a DNN (also referred to as an APN) configured for accessing a second network or a proxy network element via a first network; and that used for requesting the first network for a first tunnel (for example a first PDU session) by a terminal, where the first tunnel is used for transmitting data between the terminal and the second network or data between the terminal and the proxy network element.

The data between the terminal and the second network may include at least one of the following: control signaling (such as NAS signaling) between the terminal and the second network, and user-plane data between the terminal and the second network.

In an implementation, the first route selection information is sent to the terminal by using a UE route selection policy rule (URSP). For example, the UE route selection policy rule includes first traffic description information. Route selection information corresponding to the first traffic description information is the first DNN.

In an implementation, after the first route selection information is determined through an agreement between a first network operator and a second network operator, the first route selection information is sent.

In an implementation, the agreement between the first network operator and the second network operator is an agreement (that is, inter-operator agreement) between the second network operator and the first network operator related to the second network or proxy network element to which access is performed via the first network.

The agreement between the first network operator and the second network operator may include at least one of the following: IP triplet information of the proxy network element (such as an N3IWF of the second network), whether the second network requires different QoS, whether the second network requires QoS guarantee, and a mapping relationship between DSCPs and QoS (for example, a mapping relationship between DSCPs and QoS in the second network).

Figure 8:
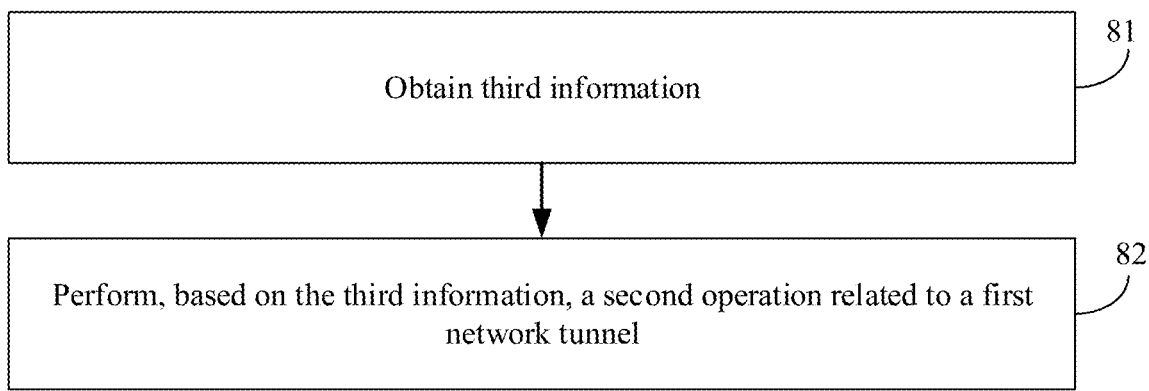
FIG. 8 is a schematic flowchart of a method for guaranteeing data transmission according to still some other embodiments of this disclosure.

Referring to FIG. 8, this disclosure further provides a method for guaranteeing data transmission, applied to a fourth communications device. The fourth communications device includes but is not limited to a terminal. The method includes steps 81 and 82.

Step 81: Obtain third information.

The third information includes at least one of the following: data packet related information of data in the first network tunnel, identification information of a second network tunnel associated with an IPsec tunnel, QoS information of the second network tunnel, and first route selection information.

Step 82: Perform, based on the third information, a second operation related to the first network tunnel.

Specifically, the IPsec tunnel is an IPsec tunnel between a terminal and a proxy network element.

Specifically, the first route selection information is described in the embodiment of FIG. 7.

Specifically, the QoS information is described above.

Optionally, the performing a second operation related to the first network tunnel includes at least one of the following:

for access to the second network or the proxy network element via the first network, requesting the first network by using the first DNN to establish a PDU session;

determining data packet filtering information (such as uplink data packet filtering information) for the first network tunnel based on the data packet related information of the data in the first network tunnel; and in a case that QoS information of a second network tunnel associated with an IPsec tunnel that is corresponding to the first network tunnel is of a GBR type, transmitting updated QoS flow description information to the first network, where the updated QoS flow description information includes all QoS parameter information related to a GBR of the second network tunnel.

The proxy network element is a proxy network element via which the first network and the second network interacts, for example, an N3IWF. The proxy network element may be a network element of the first network or the second network.

Specifically, the GBR-related QoS parameter information is described above.

Specifically, the data packet related information in the first network tunnel is the data packet related information. Details are described in the embodiment of FIG. 6 and are not repeated herein.

In an implementation, it can be determined, based on the SPI and/or DSCP in the data packet related information of the data in the first network tunnel, that the data packet filtering information (such as uplink data packet filtering information) of the first network tunnel is one of the following: the SPI, the SPI corresponding to the DSCP, and the DSCP.

In an implementation, the QoS information of the second network tunnel associated with the IPsec tunnel that is indicated by the SPI or an SPI associated with the DSCP can be determined based on the SPI and/or DSCP in the data packet related information of the data in the first network tunnel, an identifier of the second network tunnel associated with the IPsec tunnel, and/or the QoS information of the second network tunnel.

Figure 9:
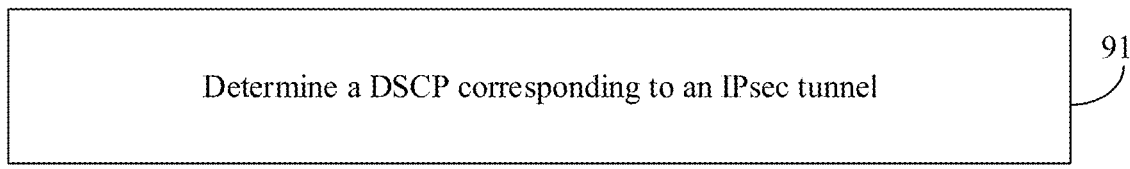
FIG. 9 is a schematic flowchart of a method for guaranteeing data transmission according to still some other embodiments of this disclosure.

Referring to FIG. 9, an embodiment of this disclosure provides a method for guaranteeing data transmission, applied to a fifth communications device. The fifth communications device includes but is not limited to at least one of the following: a proxy network element (such as an N3IWF of a second network). The method includes the following steps.

Step 91: Determine a DSCP corresponding to an IPsec tunnel.

The determining a DSCP corresponding to an IPsec tunnel includes at least one of the following:

mapping a separate DSCP for each IPsec tunnel;

mapping a separate DSCP for each IPsec tunnel, where a second network tunnel associated with the IPsec tunnel is of a GBR type; and mapping a separate DSCP for each IPsec tunnel, where QoS information of the second network tunnel associated with the IPsec tunnel is at least one of the following: standardized QoS information, high-priority service QoS information, a QoS class indicator being 1, a QoS class indicator being 5, and a QoS class indicator being 69.

Further, the determining a DSCP corresponding to an IPsec tunnel includes:

in a case that a preset condition is met, determining the DSCP corresponding to the IPsec tunnel.

The preset condition includes at least one of the following:

that the fifth communications device is used for a terminal to access a second network via a first network;

that the first network supports QoS guarantee;

that the fifth communications device is of a 3GPP access type;

that the first network is a 3GPP type network, and a request for establishment of a tunnel between the terminal and the second network is received;

that a request for modification of a tunnel between the terminal and the second network is received;

that an operation of mapping from a tunnel between the terminal and the second network to an IPsec tunnel is performed; and that the IPsec tunnel is established.

In this embodiment of this disclosure, when the terminal accesses the network service of the first network via the second network, the quality of service of the service in the second network can be guaranteed in the first network.

The following describes the method for guaranteeing data transmission in the embodiments of this disclosure with reference to specific application scenarios.

Figure 10:
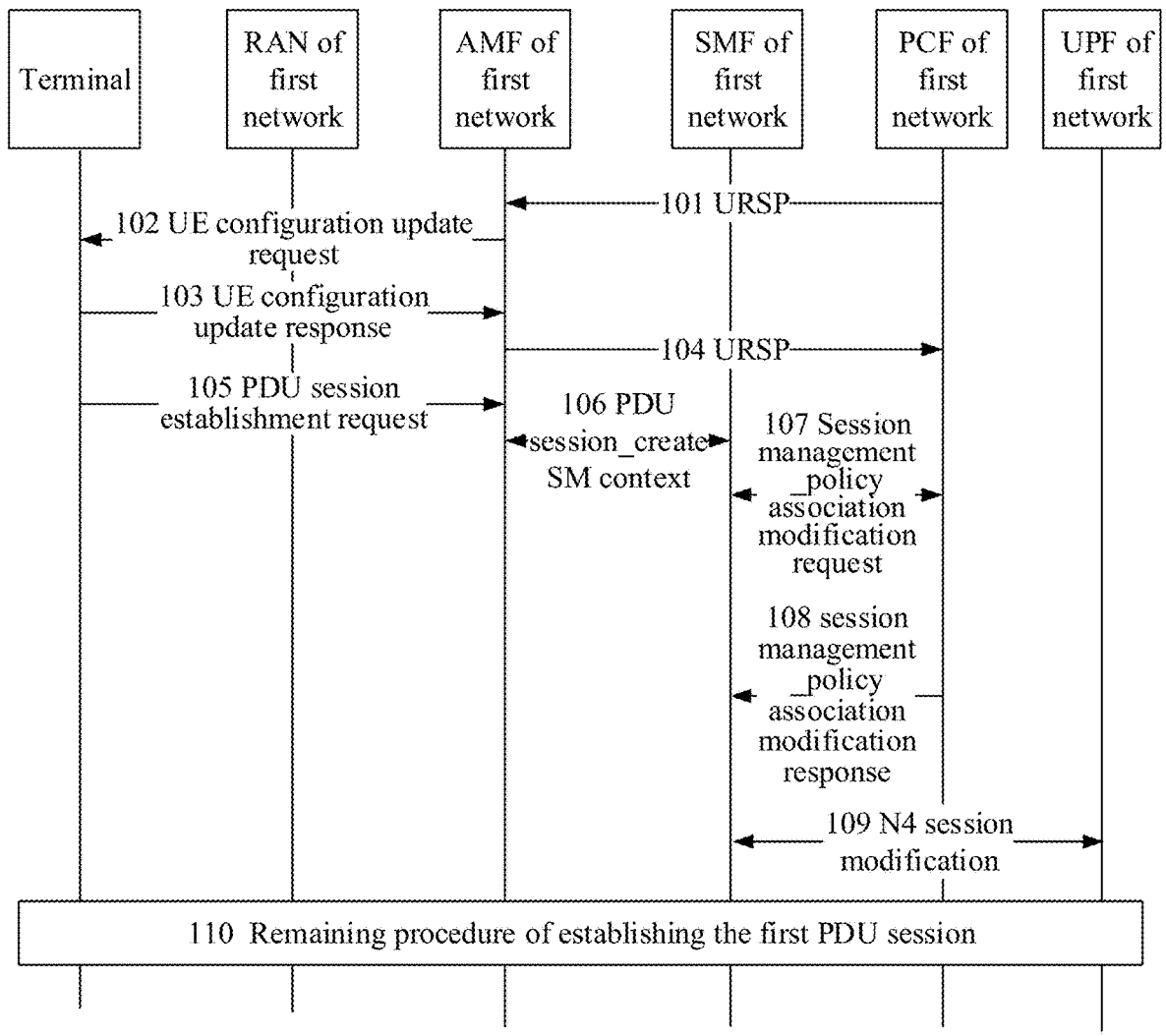
FIG. 10 is a schematic flowchart of a method for guaranteeing data transmission in an application scenario 1 according to an embodiment of this disclosure.

Application scenario 1 in this embodiment of this disclosure:

The application scenario 1 in this embodiment of this disclosure mainly describes a process in which the terminal obtains configuration information of the first DNN from the first network and establishes the first PDU session based on the first DNN. The proxy network element is a proxy (such as an N3IWF) between the first network and the second network, and may be a communications network element of the first network or a communications network element of the second network. In the following description, an AMF represents an AMF of the first network, an SMF represents an SMF of the first network, a UPF represents a UPF of the first network, a PCF represents a PCF of the first network, and a RAN network element represents a RAN network element of the first network. Referring to FIG. 10, the method for guaranteeing data transmission includes the following steps 101 to 110.

Step 101: The PCF transmits first route selection information (specifically as described in FIG. 7) of the terminal to the AMF.

The first route selection information includes at least one of the following: a first DNN and first traffic description information (Traffic descriptor).

Specifically, the first traffic description information is IP description information (as described in FIG. 7) of the proxy network element.

Specifically, the first DNN is described in FIG. 7.

Specifically, the PCF may determine the first DNN based on the agreement between the first network operator and the second network operator.

Step 102: Transmit the first route selection information to the UE. The AMF may transmit the first URSP to the UE by using a UE configuration update request message. The first URSP includes the first route selection information. The first route selection information is described in the embodiment of FIG. 7.

Step 103: The UE transmits a UE configuration update response message to the AMF of the first network.

Step 104: The AMF transmits a response message to the PCF.

Step 105: When needing to access the second network via the first network, the UE uses the first DNN to request the first network to establish a first PDU session. Optionally, the UE transmits a NAS message to the AMF, where the NAS message includes the first DNN and a PDU session establishment request message.

Details are described in the embodiment of FIG. 8.

Step 106: The AMF transmits a PDU session_create session management (Session Management, SM) context to the SMF. The PDU session_create session management context includes the first DNN.

Step 107: The SMF transmits a session management_policy association modification request to the PCF. The session management_policy association modification request includes the first DNN.

The PCF obtains second information. In an implementation, the second information includes the first DNN.

The performing, based on the second information, the first operation related to the first network tunnel includes: determining data monitoring information (which is specifically described in FIG. 6).

Specifically, during establishment of the first PDU session, the PCF obtains the first DNN, determines, based on the first DNN, data monitoring information related to the first PDU session, and transmits the data monitoring information to the UPF of the first PDU session via the SMF.

Step 108: The SMF transmits a session management_policy association modification response to the PCF. The session management_policy association modification response includes the data monitoring information of the first PDU session.

Step 109: the SMF transmits an N4 session modification request to the UPF. The N4 session modification request includes the data monitoring information of the first PDU session. Subsequently, the UPF may monitor data in the first PDU session based on data establishment information.

Step 110: Proceed with the remaining procedure of establishing the first PDU session.

Figure 11:
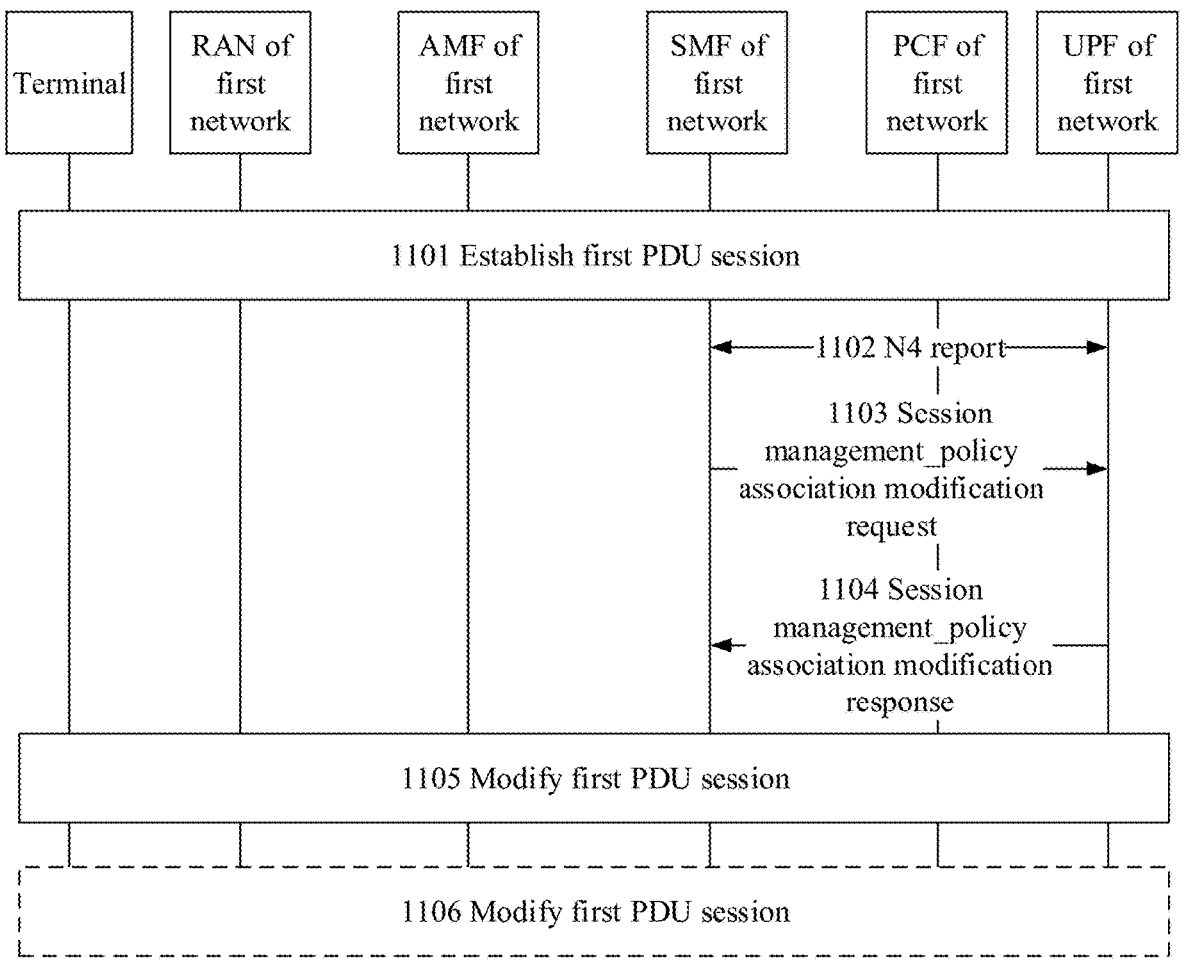
FIG. 11 is a schematic flowchart of a method for guaranteeing data transmission in an application scenario 2 according to an embodiment of this disclosure.

Application scenario 2 in this embodiment of this disclosure:

The application scenario 2 in this embodiment of this disclosure mainly describes that after the terminal (using the UE as an example for description) establishes a first PDU session based on a first DNN, and after the UPF detects first data (such as data between the terminal and the proxy network element) and notifies the PCF, the PCF initiates the process of mapping a first network tunnel. The proxy network element is a proxy (such as an N3IWF) between the first network and the second network, and may be a communications network element of the first network or a communications network element of the second network. In the following description, an AMF represents an AMF of the first network, an SMF represents an SMF of the first network, a UPF represents a UPF of the first network, a PCF represents a PCF of the first network, and a RAN network element represents a RAN network element of the first network. Referring to FIG. 11, the method for data transmission includes the following steps 1101 to 1106.

Step 1101: The UE establishes a first network PDU (protocol data unit) session (referred to as the first PDU session for short) with the first network via the first DNN. The first network PDU session is used to transfer data between the terminal and the proxy network element or between the terminal and the second network. The data between the terminal and the second network may be control signaling and/or user-plane data.

Step 1102: Based on the data monitoring information, the UPF detects data packet related information of the first data. The first data may be data related to an IP address of the first PDU session. When a DNN and/or SPI in the data packet related information of the first data does not have a corresponding QoS flow, the UPF transmits an N4 report to the SMF, where the N4 report may include the data packet related information of the first data.

Step 1103: The SMF transmits a session management policy association modification request to the PCF. The session management policy association modification request may include the data packet related information of the first data.

Specifically, the PCF obtains information about the first DNN when the UE requests for establishment of the first PDU session.

Specifically, the PCF obtains, based on the first DNN, at least one of the following: a mapping policy for the first network tunnel, a mapping relationship between DSCPs and QoS information, and data monitoring information.

The PCF obtains the second information. In an implementation, the second information includes at least one of the following: the data packet related information of the first data, the first DNN, the mapping policy for the first network tunnel, and the mapping relationship between DSCPs and QoS information.

Based on the second information, a first operation related to the first network tunnel is performed.

The first operation related to the first network tunnel is specifically described in the embodiment of FIG. 6.

Step 1104: The PCF transmits the session management policy association modification response to the SMF. The response message may include QoS information and/or data packet filtering related information (as described in FIG. 6) of the newly added QoS flow. In an implementation, the response message includes a newly authorized QoS rule and/or a newly authorized QoS flow description. The newly authorized QoS rule includes data packet filtering related information of the QoS flow, and the newly authorized QoS flow description includes QoS information of the newly added QoS flow.

Step 1105, the SMF triggers a PDU session modification procedure based on a response of the PCF, and modifies the first PDU session by adding an authorized QoS rule and/or an authorized QoS flow description.

Step 1106: Optionally, after establishment of the newly added QoS flow is completed, the terminal may initiate a PDU session modification request process to the SMF to request modification of the QoS flow description of the first PDU session. The modifying the QoS flow description is requesting to modify the QoS information of the QoS flow to GBR-related QoS parameter information. The GBR-related QoS parameter information may be GBR-related QoS parameter information in QoS information of a second network tunnel. Data of the second network tunnel or data of the IPsec tunnel associated with the second network tunnel is mapped to the QoS flow (that is, the first network tunnel).

Subsequently, the data of the data packet filtering related information will be transmitted via the QoS flow to implement QoS guarantee. It is not difficult to understand that the data between the terminal and the second network can be guaranteed in the first network, especially for data of important services.

Figure 12:
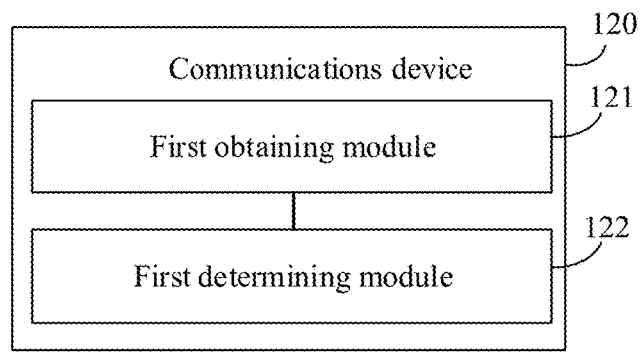
FIG. 12 is a structural diagram of another communications device according to an embodiment of this disclosure.

Referring to FIG. 12, an embodiment of this disclosure provides a communications device. The communications device is a first communications device. As shown in FIG. 12, the communications device 120 includes:

- a first obtaining module 121, configured to obtain first information; and
- a first determining module 122, configured to determine, based on the first information, a DSCP corresponding to an IPsec tunnel.

The first information includes at least one of the following:

quality of service QoS information of a second network tunnel, data type information, a mapping relationship between differentiated service code points DSCPs and QoS information, a first QoS information requirement, and a first DSCP.

The first QoS information requirement is a QoS information requirement for control signaling or signaling IPsec tunnel data.

The data type information includes at least one of the following: control signaling of a second network, user-plane data of the second network, signaling IPsec tunnel data, and data IPsec tunnel data.

The first DSCP is a DSCP associated with control signaling or a signaling IPsec tunnel.

Optionally, the first determining module 122 is specifically configured to perform at least one of the following:

- setting a DSCP corresponding to signaling IPsec tunnel as the first DSCP;
- mapping a separate DSCP for each IPsec tunnel;
- mapping a separate DSCP for each IPsec tunnel, where a second network tunnel associated with the IPsec tunnel is of a GBR type; and
- mapping a separate DSCP for each IPsec tunnel, where QoS information of the second network tunnel associated with the IPsec tunnel is at least one of the following: standardized QoS information, high-priority service QoS information, a QoS class indicator being 1, a QoS class indicator being 5, and a QoS class indicator being 69.

Optionally, the first determining module 122 is specifically configured to perform at least one of the following:

- based on the QoS information of the second network tunnel and/or the mapping relationship between DSCPs and QoS information, determining the DSCP corresponding to the IPsec tunnel, where the second network tunnel is a second network tunnel associated with the IPsec tunnel;
- setting, based on the first information, a DSCP corresponding to a signaling IPsec tunnel as the first DSCP; and
- based on the mapping relationship between DSCPs and QoS information and/or the first QoS information requirement, setting the DSCP corresponding to the signaling IPsec tunnel as a DSCP corresponding to QoS information that is in the first QoS information requirement.

Optionally, the first determining module 122 is specifically configured to:

- in a case that a preset condition is met, determining, based on the first information, the DSCP corresponding to the IPsec tunnel.

The preset condition includes at least one of the following:

- that the first communications device is used for a terminal to access the second network via a first network;
- that the first network supports QoS guarantee;
- that the first communications device is of a 3GPP access type;
- that the first network is a 3GPP type network, and a request for establishment of a tunnel between the terminal and the second network is received;
- that a request for modification of a tunnel between the terminal and the second network is received;
- that an operation of mapping from a tunnel between the terminal and the second network to an IPsec tunnel is performed; and
- that the IPsec tunnel is established.

In this embodiment, the communications device 120 is capable of implementing the processes implemented in the method embodiment shown in FIG. 5 of this disclosure, with the same beneficial effects achieved. To avoid repetition, details are not described herein again.

Figure 13:
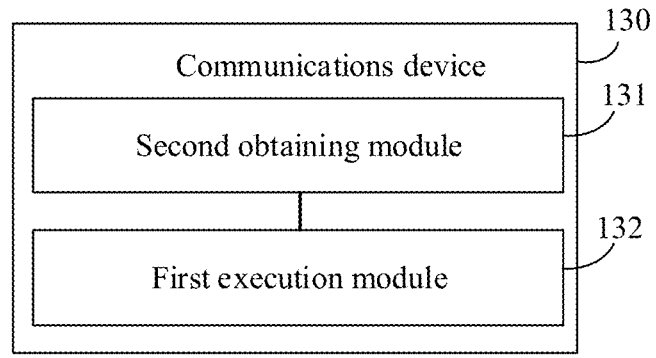
FIG. 13 is a structural diagram of another communications device according to an embodiment of this disclosure.

Referring to FIG. 13, an embodiment of this disclosure provides a communications device. The communications device is a second communications device. As shown in FIG. 13, the communications device 130 includes:

- a second obtaining module 131, configured to obtain second information, where the second information includes at least one of the following: data packet related information of first data, a first DNN, GBR-related QoS parameter information of a first network tunnel, a mapping policy of the first network tunnel, a mapping relationship between DSCPs and QoS information, and data monitoring information; and
- a first execution module 132, configured to perform, based on the second information, a first operation related to the first network tunnel.

Optionally, the data packet related information includes at least one of the following:

a DSCP, a security parameter index SPI, a first DSCP, and a second DSCP.

The first DSCP is a DSCP associated with control signaling or a signaling IPsec tunnel, and the second DSCP is a DSCP associated with user-plane data or a data IPsec tunnel.

Optionally, the first execution module 132 is specifically configured to perform at least one of the following:

- determining a QoS information requirement of the first data;
- determining a QoS information requirement of an IPsec tunnel;
- determining that the first data is data of a signaling IPsec tunnel;
- determining that the first data is data of a data IPsec tunnel;
- determining that the IPsec tunnel is a signaling IPsec tunnel;
- determining that the IPsec tunnel is a data IPsec tunnel;
- determining data monitoring information; and
- performing a mapping operation for the first network tunnel.

Optionally, the first execution module 132 is specifically configured to perform at least one of the following:
- determining that the QoS information requirement of the first data is QoS information mapped to the DSCP;
- determining that a QoS information requirement of an IPsec tunnel indicated by the SPI is QoS information mapped to the DSCP;
- determining that a QoS information requirement of a signaling IPsec tunnel is QoS information mapped to the first DSCP; and
- determining that a QoS information requirement of a data IPsec tunnel is QoS information mapped to the second DSCP.

Optionally, the first execution module 132 is specifically configured to perform at least one of the following:
- performing a mapping operation for a first network tunnel related to the IPsec tunnel; and
- performing a mapping operation for a first network tunnel related to the DSCP.

Optionally, the first execution module 132 is specifically configured to perform at least one of the following:
- mapping different first network tunnels to different IPsec tunnels;
- determining data packet filtering related information for the first network tunnel mapped to the IPsec tunnel;
- determining QoS information of the first network tunnel mapped to the IPsec tunnel;
- performing a mapping operation for a first network tunnel related to the signaling IPsec tunnel; and
- performing a mapping operation for a first network tunnel related to the data IPsec tunnel.

Optionally, the first execution module 132 is specifically configured to perform at least one of the following:
- mapping different first network tunnels to different DSCPs;
- mapping different first network tunnels to IPsec tunnels that are corresponding to different DSCPs;
- determining data packet filtering related information for the first network tunnel mapped to the DSCP;
- determining QoS information of the first network tunnel mapped to the DSCP;
- performing a mapping operation for a first network tunnel related to the first DSCP; and
- performing a mapping operation for a first network tunnel related to the second DSCP.

Optionally, the first execution module 132 is specifically configured to perform at least one of the following:
- determining, based on the first DSCP, that the first data is data of a signaling IPsec tunnel;
- determining, based on the second DSCP, that the first data is data of a data IPsec tunnel;
- determining, based on the first DSCP and the SPI, that an IPsec tunnel indicated by the SPI is a signaling IPsec tunnel;
- determining, based on the second DSCP and the SPI, that an IPsec tunnel indicated by the SPI is a data IPsec tunnel.

In this embodiment, the communications device 130 is capable of implementing the processes implemented in the method embodiment shown in FIG. 6 of this disclosure, with the same beneficial effects achieved. To avoid repetition, details are not described herein again.

Figure 14:
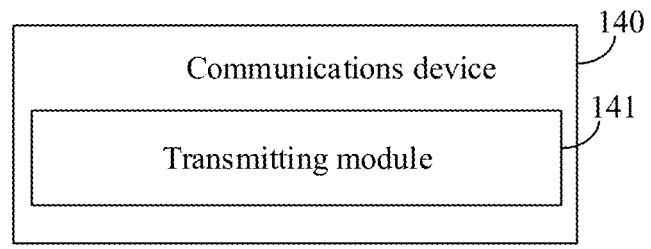
FIG. 14 is a structural diagram of another communications device according to an embodiment of this disclosure.

Referring to FIG. 14, an embodiment of this disclosure provides a communications device. The communications device is a third communications device. As shown in FIG. 14, the communications device 140 includes:
- a transmitting module 141, configured to transmit first route selection information.

The first route selection information includes at least one of the following:
- a first DNN and first traffic description information; where the first DNN is one of the following:
  - a DNN configured for accessing a second network or a proxy network element via a first network;
  - that used for a terminal to request a first tunnel with the first network, where the first tunnel is used for transmitting data between the terminal and the second network or data between the terminal and the proxy network element; and
- the first traffic description information is IP description information of the proxy network element.

In this embodiment, the communications device 140 is capable of implementing the processes implemented in the method embodiment shown in FIG. 7 of this disclosure, with the same beneficial effects achieved. To avoid repetition, details are not described herein again.

Figure 15:
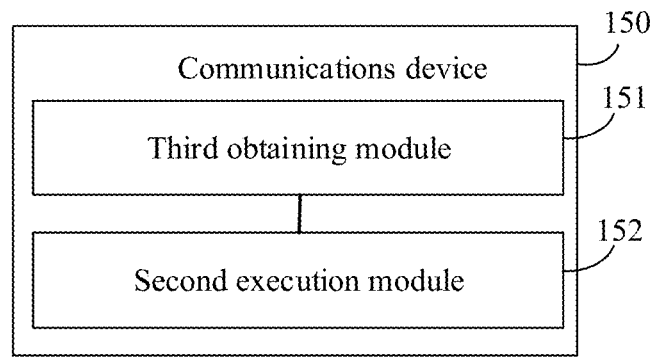
FIG. 15 is a structural diagram of another communications device according to an embodiment of this disclosure.

Referring to FIG. 15, an embodiment of this disclosure provides a communications device. The communications device is a fourth communications device. As shown in FIG. 15, the communications device 150 includes:
- a third obtaining module 151, configured to obtain third information; and
- a second execution module 152, configured to perform, based on the third information, a second operation related to a first network tunnel.

The third information includes at least one of the following: data packet related information of data in the first network tunnel, identification information of a second network tunnel associated with an IPsec tunnel, QoS information of the second network tunnel, and first route selection information.

The first route selection information includes at least one of the following:
- a first DNN and first traffic description information; where the first DNN is one of the following:
  - a DNN configured for accessing a second network or a proxy network element via a first network;
  - that used for a terminal to request a first tunnel with the first network, where the first tunnel is used for transmitting data between the terminal and the second network or data between the terminal and the proxy network element; and
- the first traffic description information is IP description information of the proxy network element.

Optionally, the second execution module 152 is specifically configured to perform at least one of the following:
- for access to the second network or the proxy network element via the first network, requesting the first network by using the first DNN to establish a PDU session;
- determining data packet filtering information for the first network tunnel based on the data packet related information of the data in the first network tunnel; and
- in a case that QoS information of a second network tunnel associated with an IPsec tunnel that is corresponding to the first network tunnel is of a GBR type, transmitting updated QoS flow description information to the first network, where the updated QoS flow description information includes all QoS parameter information related to a GBR of the second network tunnel.

Optionally, the second execution module 152 is specifically configured to perform at least one of the following:

based on a SPI and/or a DSCP in the data packet related information of the data in the first network tunnel, determining that uplink data packet filtering information of the first network tunnel is one of the following: the SPI, an SPI corresponding to the DSCP, and the DSCP.

In this embodiment, the communications device 150 is capable of implementing the processes implemented in the method embodiment shown in FIG. 8 of this disclosure, with the same beneficial effects achieved. To avoid repetition, details are not described herein again.

Figure 16:
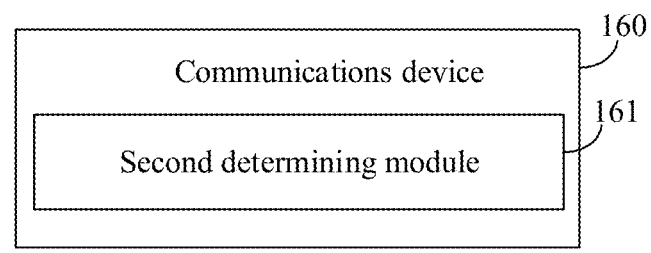
FIG. 16 is a structural diagram of another communications device according to an embodiment of this disclosure.

Referring to FIG. 16, an embodiment of this disclosure provides a communications device. The communications device is a fifth communications device. As shown in FIG. 16, the communications device 160 includes:

a second determining module 161, configured to determine a DSCP corresponding to an IPsec tunnel.

The determining a DSCP corresponding to an IPsec tunnel includes at least one of the following:

mapping a separate DSCP for each IPsec tunnel;

mapping a separate DSCP for each IPsec tunnel, where a second network tunnel associated with the IPsec tunnel is of a GBR type; and mapping a separate DSCP for each IPsec tunnel, where QoS information of the second network tunnel associated with the IPsec tunnel is at least one of the following: standardized QoS information, high-priority service QoS information, a QoS class indicator being 1, a QoS class indicator being 5, and a QoS class indicator being 69.

Optionally, the first determining module 161 is specifically configured to:

in a case that a preset condition is met, determining, based on the first information, the DSCP corresponding to the IPsec tunnel, where The preset condition includes at least one of the following:

that the fifth communications device is used for a terminal to access a second network via a first network;

that the first network supports QoS guarantee;

that the fifth communications device is of a 3GPP access type;

that the first network is a 3GPP type network, and a request for establishment of a tunnel between the terminal and the second network is received;

that a request for modification of a tunnel between the terminal and the second network is received;

that an operation of mapping from a tunnel between the terminal and the second network to an IPsec tunnel is performed; and that the IPsec tunnel is established.

In this embodiment, the communications device 160 is capable of implementing the processes implemented in the method embodiment shown in FIG. 9 of this disclosure, with the same beneficial effects achieved. To avoid repetition, details are not described herein again.

Figure 17:
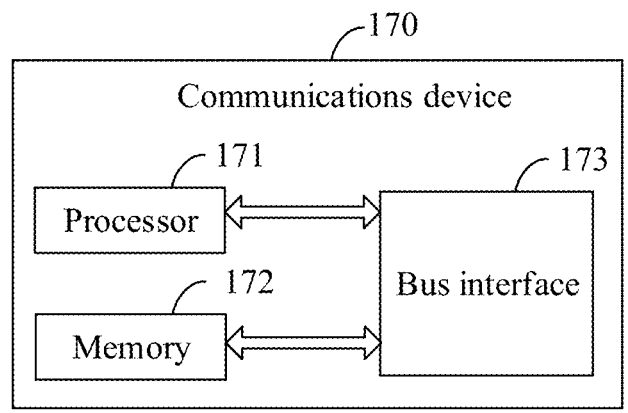
FIG. 17 is a structural diagram of another communications device according to an embodiment of this disclosure.

Referring to FIG. 17, FIG. 17 is a structural diagram of another communications device according to an embodiment of this disclosure. As shown in FIG. 17, the communications device 170 includes a processor 171, a memory 172, and a program stored on the memory 172 and capable of running on the processor. The components of the communications device 170 are coupled together by using the bus interface 173, and when the program is executed by the processor 171, the processes implemented in the method embodiment shown in FIG. 5 are implemented, or the processes implemented in the method embodiment shown in FIG. 6 are implemented, or the processes implemented in the method embodiment shown in FIG. 7 are implemented, or the processes implemented in the method embodiment shown in FIG. 8 are implemented, or the processes implemented in the method embodiment shown in FIG. 9 are implemented, with the same technical effects achieved. To avoid repetition, details are not described herein again.

An embodiment of this disclosure further provides a computer-readable storage medium, where a program is stored in the computer-readable storage medium, and when the program is executed by a processor, the processes implemented in the method embodiment shown in FIG. 5 are implemented, or the processes implemented in the method embodiment shown in FIG. 6 are implemented, or the processes implemented in the method embodiment shown in FIG. 7 are implemented, or the processes implemented in the method embodiment shown in FIG. 8 are implemented, or the processes implemented in the method embodiment shown in FIG. 9 are implemented, with the same technical effects achieved. To avoid repetition, details are not described herein again. The computer-readable storage medium is, for example, a read-only memory (ROM), a random access memory (RAM), a magnetic disk, or an optical disc.

It should be noted that the terms "include", "comprise", or any of their variants in this specification are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more restrictions, an element preceded by "includes a . . . " does not preclude the existence of other identical elements in the process, method, article, or apparatus that includes the element.

According to the description of the foregoing implementations, a person skilled in the art can clearly understand that the method in the foregoing embodiments may be implemented by software in addition to a necessary universal hardware platform or by hardware only. In most cases, the former is a more preferred implementation. Based on such an understanding, the technical solutions of this disclosure essentially, or the part contributing to the related art, may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The embodiments of the present disclosure are described above with reference to the accompanying drawings, but the present disclosure is not limited to the embodiments. The embodiments are only illustrative rather than restrictive. Inspired by the present disclosure, a person of ordinary skill in the art can still derive a plurality of variations without departing from the essence of the present disclosure and the protection scope of the claims. All these variations shall fall within the protection of the present disclosure.

What is claimed is:

1. A method for guaranteeing data transmission, applied to a first communications device, wherein the first communications device implementing a non-3GPP interworking function (N3IWF) of a second network and the first communications device which is used for a terminal to access the second network via a first network, and the method comprises:

obtaining first information; and determining, based on the first information, a differentiated services code point (DSCP) corresponding to an data Internet protocol security tunnel (IPsec) tunnel;

setting the DSCP corresponding to the data IPsec tunnel as the DSCP mapped to a quality of service(QOS) parameter information of a QoS flow of the second network;

wherein the first information comprises:

a mapping relationship between a plurality of DSCPs and a plurality of QOS parameter information in a one-to-one manner, and QoS parameter information of the QoS flow of the second network;

wherein, the QoS parameter information of the QoS flow of the second network is obtained by the first communications device from another communications device of the second network, and each QoS parameter information comprises a QoS class indicator;

wherein the mapping relationship between the plurality of DSCPs and the plurality of QoS parameter information is preconfigured in the first communications device;

wherein the QoS flow of the second network is associated with the data IPsec tunnel, and wherein the data IPsec tunnel is a data IPsec tunnel between the terminal and the second network;

the setting of the DSCPs enables the first network to perform QoS differentiation based on header information of packets of the data IPSec tunnel;

the mapping relationship between the plurality of DSCPs and the plurality of QoS parameter information is a mapping relationship between a plurality of DSCPs and a plurality of QoS parameter information in the second network; and there is no control-plane interface between the first network and the N3IWF in the second network.

2. The method according to claim 1, wherein the determining, based on the first information, a DSCP corresponding to a data IPsec tunnel comprises:

in a case that a preset condition is met, determining, based on the first information, the DSCP corresponding to the data IPsec tunnel, wherein the preset condition comprises at least one of the following:

that the first network supports QoS guarantee;

that the first communications device is of a 3GPP access type;

that the first network is a 3GPP type network, and a request for establishment of a tunnel between the terminal and the second network is received;

that a request for modification of a QoS flow between the terminal and the second network is received;

that an operation of mapping from a QoS flow between the terminal and the second network to a data IPsec tunnel is performed; and that the data IPsec tunnel is established.

3. The method according to claim 1, wherein the performing a first operation related to QoS flow of the first network further comprises:

performing a mapping operation for the QoS flow of the first network, wherein the performing the mapping operation for QoS flow of the first network comprises at least one of the following:

performing the mapping operation for the QoS flow of the first network related to the data IPsec tunnel; or performing the mapping operation for the QoS flow of the first network related to the DSCP.

4. The method according to claim 3, wherein the determining a QoS parameter information requirement of the first data comprises:

determining that the QoS parameter information requirement of the first data is QoS parameter information mapped to the DSCP;

and/or the determining QoS parameter information requirement of a data IPsec tunnel comprises at least one of the following:

determining that a QoS parameter information requirement of a data IPsec tunnel indicated by the SPI is QoS parameter information mapped to the DSCP;

determining that a QoS parameter information requirement of a signaling Ipsec tunnel is QoS parameter information mapped to the first DSCP; and determining that a QoS parameter information requirement of a data Ipsec tunnel is QoS parameter information mapped to the second DSCP.

5. The method according to claim 3, wherein the performing a mapping operation for a QoS flow of the first network related to the data IPsec tunnel comprises at least one of the following:

mapping different QoS flows of the first network to different data IPsec tunnels;

determining data packet filtering related information for the QoS flow of the first network mapped to the data IPsec tunnel;

determining QoS parameter information in the QoS flow of the first network mapped to the data IPsec tunnel;

performing a mapping operation for a QoS flow of the first network related to a signaling IPsec tunnel; or performing a mapping operation for a QoS flow of the first network related to a data IPsec tunnel.

6. The method according to claim 3, wherein the performing a mapping operation for a QoS flow of the first network related to the DSCP comprises at least one of the following:

mapping different QoS flows of the first network to different DSCPs;

mapping different QoS flows of the first network to IPsec tunnels that are corresponding to different DSCPs;

determining data packet filtering related information for QoS flow of the first network mapped to the DSCP;

determining QoS parameter information of QoS flow of the first network mapped to the DSCP;

performing a mapping operation for a QoS flow of the first network related to the first DSCP; or performing a mapping operation for a QoS flow of the first network related to the second DSCP.

7. A communications device, comprising a processor, a memory, and a program stored in the memory and capable of running on the processor, wherein the program, when executed by the processor, causes the processor to perform a method for guaranteeing data transmission, wherein the first communications device implementing a non-3GPP interworking function (N3IWF) of a second network and the first communications device which is used for a terminal to access the second network via a first network, and the method comprises:

obtaining first information; and determining, based on the first information, a differentiated services code point (DSCP) corresponding to a data IPsec tunnel;

setting the DSCP corresponding to the data IPsec tunnel as the DSCP mapped to a quality of service(QOS) parameter information of a QoS flow of the second network;
wherein
the first information comprises:
a mapping relationship between a plurality of DSCPs and a plurality of QoS parameter information in a one-to-one manner, and QoS parameter information of QoS flow of the second network; wherein, the QoS parameter information of the QoS flow of the second network is obtained by the first communications device from another communications device of the second network, and each QoS parameter information comprises a QoS class indicator;
wherein the mapping relationship between the plurality of DSCPs and the plurality of QoS parameter information is preconfigured in the first communications device;
wherein the QoS flow of the second network is associated with the data IPsec tunnel,
wherein the data IPsec tunnel is a data IPsec tunnel between the terminal and the second network;
the setting of the DSCPs enables the first network to perform QoS differentiation based on header information of packets of the data IPSec tunnel;
the mapping relationship between the plurality of DSCPs and the plurality of QoS parameter information is a mapping relationship between a plurality of DSCPs and a plurality of QoS parameter information in the second network; and
there is no control-plane interface between the first network and the N3IWF in the second network.

8. The method according to claim 1, wherein
the DSCP corresponding to the data IPsec tunnel is a DSCP in an IP header of data of the data IPsec tunnel.

9. The method according to claim 1, wherein
the QoS parameter information comprises at least one of the following: QoS class indicator, priority information, packet delay budget, packet error rate, maximum data burst, and whether guaranteed bit rate GBR is required, whether there is a default average window requirement, default average window, and GBR-related QoS parameter information;
wherein the QoS class indicator comprises 5Q1.

10. The method according to claim 1, wherein
the data IPsec tunnel is a data IPsec tunnel between the first communications device and the terminal.

11. The method according claim 1, wherein
the first network is a public network, and the second network is a non-public network; or, the first network is a non-public network, and the second network is a public network; or, the first network is a first non-public network, and the second network is a second non-public network; or, the first network is a first public network, and the second network is a second public network.

12. The method according claim 1, wherein
the agreement between the first network operator and the second network operator is acquired by configuration.

13. The method according to claim 1, wherein
the QoS parameter information comprises at least one of the following: QoS class indicator, priority information, packet delay budget, packet error rate, maximum data burst, and whether guaranteed bit rate GBR is required, whether there is a default average window requirement, default average window, and GBR-related QoS parameter information;
wherein the QoS class indicator comprises 5Q1.

14. The method according claim 1, wherein
the first network is a public network, and the second network is a non-public network; or, the first network is a non-public network, and the second network is a public network; or, the first network is a first non-public network, and the second network is a second non-public network; or, the first network is a first public network, and the second network is a second public network.

15. The communications device according to claim 7, wherein
the DSCP corresponding to the data IPsec tunnel is a DSCP in an IP header of data of the data IPsec tunnel.

16. The communications device according to claim 7, wherein the determining, based on the first information, a DSCP corresponding to a data IPsec tunnel comprises:
in a case that a preset condition is met, determining, based on the first information, the DSCP corresponding to the data IPsec tunnel, wherein
the preset condition comprises at least one of the following:
that the first network supports QoS guarantee;
that the first communications device is of a 3GPP access type;
that the first network is a 3GPP type network, and a request for establishment of a tunnel between the terminal and the second network is received;
that a request for modification of a QoS flow between the terminal and the second network is received;
that an operation of mapping from a QoS flow between the terminal and the second network to a data IPsec tunnel is performed; and
that the data IPsec tunnel is established.

17. A non-transitory computer-readable storage medium storing a program, wherein when the program is executed by a processor, a method for guaranteeing data transmission is implemented, wherein the method is applied to a first communications device, wherein the first communications device implementing a non-3GPP interworking function (N3IWF) of a second network and the first communications device which is used for a terminal to access the second network via a first network, and the method comprises:
obtaining first information; and
determining, based on the first information, a differentiated services code point (DSCP) corresponding to an data Internet protocol security tunnel (IPsec) tunnel;
setting the DSCP corresponding to the data IPsec tunnel as the DSCP mapped to a quality of service (QOS) parameter information of a QoS flow of the second network;
wherein the first information comprises:
a mapping relationship between a plurality of DSCPs and a plurality of QoS parameter information in a one-to-one manner, and QoS parameter information of QoS flow of the second network; wherein, the QoS parameter information of the QoS flow of the second network is obtained by the first communications device from another communications device of the second network, and each QoS parameter information comprises a QoS class indicator;
wherein the mapping relationship between the plurality of DSCPs and the plurality of QoS parameter information is preconfigured in the first communications device;
wherein the QoS flow of the second network is associated with the data IPsec tunnel, and wherein the data IPsec tunnel is a data IPsec tunnel between the terminal and the second network;

the setting of the DSCPs enables the first network to perform QoS differentiation based on header information of packets of the data IPSec tunnel;

the mapping relationship between the plurality of DSCPs and the plurality of QoS parameter information is a mapping relationship between a plurality of DSCPs and a plurality of QoS parameter information in the second network; and there is no control-plane interface between the first network and the N3IWF in the second network.

* * * * *